(12) United States Patent  (10) Patent No.: US 12,011,868 B2
Baer et al.  (45) Date of Patent: Jun. 18, 2024

(54) HIGH ELASTOMERIC MODULUS AND STRENGTH POLYMER CONSTRUCTS AND METHODS OF FORMING

(71) Applicant: CASE WESTERN RESERVE UNIVERSITY, Cleveland, OH (US)

(72) Inventors: Eric Baer, Cleveland Heights, OH (US); Andrew Olah, Spencer, OH (US); Cong Zhang, Shaker Heights, OH (US); Gary Wnek, Cleveland, OH (US); Nathan McMullen, Cleveland, OH (US); Chung-Fu Cheng, Aurora, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 17/944,403

(22) Filed: Sep. 14, 2022

(65) Prior Publication Data

US 2023/0085246 A1  Mar. 16, 2023

Related U.S. Application Data

(60) Provisional application No. 63/244,037, filed on Sep. 14, 2021.

(51) Int. Cl.
*B29C 59/04* (2006.01)
*B29C 43/00* (2006.01)
*B29C 45/00* (2006.01)
*B29C 48/00* (2019.01)
*B29C 48/07* (2019.01)
*C08K 7/02* (2006.01)
*B29K 23/00* (2006.01)
*B29L 31/00* (2006.01)
*B29L 31/48* (2006.01)

(52) U.S. Cl.
CPC ............ *B29C 59/04* (2013.01); *B29C 43/003* (2013.01); *B29C 45/0001* (2013.01); *B29C 48/0011* (2019.02); *B29C 48/022* (2019.02); *B29C 48/07* (2019.02); *C08K 7/02* (2013.01); *B29K 2023/065* (2013.01); *B29K 2023/08* (2013.01); *B29K 2023/12* (2013.01); *B29K 2023/16* (2013.01); *B29K 2995/0051* (2013.01); *B29L 2031/4821* (2013.01); *B29L 2031/731* (2013.01); *B29L 2031/768* (2013.01); *C08K 2201/004* (2013.01); *C08K 2201/011* (2013.01)

(58) Field of Classification Search
None
See application file for complete search history.

(56) References Cited

U.S. PATENT DOCUMENTS

| | | |
|---|---|---|
| 3,083,410 A | 4/1963 | McGlamery |
| 3,223,764 A | 12/1965 | Kahn et al. |
| 3,714,320 A | 1/1973 | Shaw |
| 4,235,834 A | 11/1980 | Friederich et al. |
| 4,282,277 A | 8/1981 | Austen et al. |
| 4,555,439 A | 11/1985 | Ueeda et al. |

(Continued)

*Primary Examiner* — Robert J Grun

(74) *Attorney, Agent, or Firm* — TAROLLI, SUNDHEIM, COVELL & TUMMINO, LLP

(57) ABSTRACT

A method of producing high modulus and strength polymer materials includes compressive rolling a semicrystalline polymer material in at least two different axial directions of the material; and axially orienting at least a portion of the compressive rolled material to a draw ratio less than the ultimate elongation or the elongation % at break of the material.

19 Claims, 22 Drawing Sheets

(56) References Cited

U.S. PATENT DOCUMENTS

| | | |
|---|---|---|
| 4,789,514 A | 12/1988 | Lo |
| 5,039,471 A | 8/1991 | Yokota et al. |
| 7,736,564 B2 | 6/2010 | Sakamoto et al. |
| 8,273,839 B2 | 9/2012 | Backer et al. |

DR-9

DR-10

DR-11

Stage 1: Cross-Rolling

Stage 2: Orientation

HIGH ELASTOMERIC MODULUS AND STRENGTH POLYMER CONSTRUCTS AND METHODS OF FORMING

RELATED APPLICATION

This application claims priority from U.S. Provisional Application No. 63/244,037, filed Sep. 14, 2021, the subject matter of which is incorporated herein by reference in its entirety.

GOVERNMENT FUNDING

This invention was made with government support under W911NF-20-2-0155 awarded by the Department of Defense; and grant 0423914 awarded by the National Science Foundation. The government has certain rights in the invention.

BACKGROUND

The physical and mechanical properties of semi-crystalline thermoplastic polymers can be improved by orienting their structures. Polymer processing methods, such as drawing, blow molding, injection molding and the like have all been used to fabricate articles of thermoplastic polymers having oriented structures.

In recent years, extensive study has been directed to methods of deforming the thermoplastic polymers in a solid state. In these methods, the polymer is mechanically deformed to obtain a desired uniaxial or biaxial molecular orientation. The polymer may be drawn, extruded or processed at temperatures within the range from the glass transition temperature to temperatures just below the crystalline melt temperatures of the polymers. In the case of stereoregular polypropylene, the polymer may be processed at temperatures as low as 0° C. Products such as strip, tubes, rods and shapes, usually having predominantly unidirectional orientation, have been fabricated by such processing methods. The extrusion methods and apparatus used for processing the polymers are similar to those used in the metal industry. Short tubular articles with high axial elongation and low circumferential elongation, for example shotgun shells, have been produced by solid state extrusion.

Polyethylene (PE), with its ultra-high modulus and strength, has attracted extensive attention in various advanced structural applications, including aerospace structures and ballistic armor. It is known that a high modulus and a high strength of PE are obtained from a highly oriented crystalline structure. This has been attributed to the flexible polyethylene backbone, which enables chain orientation along the orientation direction. As a result, the modulus and tensile strength of PE increased significantly in the direction of the orientation. Theoretical model calculations for PE based on carbon bond stretching within the crystal structure indicate that the elastic modulus can be at least 400 GPa or even higher.

Over the last 50 years, several processing methods have been developed to achieve the desired high modulus and strength. To date, the most promising processing techniques have been gel spinning, reactor powder drawing, hydrostatic extrusion, and roller drawing. Among the commercial processes, gel spinning is considered the most successful processing method for fabricating thin PE fibers with moduli ranging from to 34-200 GPa depending on the thickness of the fibers. Thick fibers typically exhibit lower moduli.

Early studies on gel spinning with ultra-high-molecular-weight polyethylene (UHMWPE) served as the basis for current technology. Currently, the gel-spinning process is routinely used to fabricate high-modulus fibers with high tensile strength using UHMWPE. With these fibers, several composite products with outstanding mechanical properties have been successfully produced. It is noteworthy that DYNEEMA and SPECTRA fibers are considered state-of-the-art UHMWPE high-modulus fibers. In general, DYNEEMA and SPECTRA fibers exhibit tangent moduli ranging between 34 and 155 GPa with a tensile strength between 1.6 and 4.1 GPa. It is important to note that the gel-spinning technique is a complex drawing processes with solvents and requires very high draw ratio (over thirty times) needed to fabricate high modulus UHMWPE fibers.

In parallel to the gel-spinning process, solvent-free extrusion processes have been studied using conventional high-density polyethylene (HDPE) with readily attainable molecular weight ($M_w$) distributions. A solvent-free extrusion process was first described by drawing during hydrostatic extrusion. Various HDPE-based products have been successfully produced using this technology. However, these fabricated PE products showed lower moduli than gel-spun products.

SUMMARY

Embodiments described herein relate to high elastomeric modulus and high strength polymer constructs and methods of forming the constructs. It was found that when a polymeric material is compression rolled in multiaxial directions that results in the reduction of the overall thickness by about 0.1% to about 10% after each compression, followed by either uniaxial or multiaxial orientation of the compression rolled material, the mechanical properties such as tensile strength and tensile modulus of the polymeric material are greatly enhanced. The enhancements of these properties are considerably greater than the original, non-compression rolled, material and most importantly considerably greater compared to materials having undergone to the same degree only uniaxial compression rolling followed by uniaxial orientation.

In some embodiments, a method of producing high modulus and strength polymer materials includes compressive rolling a semicrystalline polymer material in at least two different axial directions of the material and uniaxially orienting at least a portion of the compressive rolled material to a draw ratio less than the ultimate elongation or the elongation % at break of the material.

In some embodiments, the semicrystalline polymer material is compressive rolled at a temperature between the glass transition temperature (Tg) and the melting (Tm) of the material.

In other embodiments, the semicrystalline polymer material makes a first pass between a pair of rolls of a compressive roller to effect a reduction in thickness of the material about 0.1% to less than about 60% (e.g., about 1% to less than 25%), and thereafter makes a second pass between the rolls different from the direction of the first pass to effect a further reduction in the thickness of the material about 0.1% to less than about 60% (e.g., about 1% to less than 25%).

In some embodiments, the distance between the pair of rolls during the first pass is about 40% to about 99.9% of the thickness of the material and the distance between the pair of rolls during the second pass different from the direction of the first pass is about is about 40% to about 99.9% of the thickness the material after the first pass.

In some embodiments, the material is compressive rolled along a first axis of the material and along a second axis of the material different than the first axis, wherein the first axis and the second axis are in substantially the same plane.

In some embodiments the second axis is between about 5° to about 175° different than the first axis of the material.

In other embodiments, the second axis is about 15° to about 90°, about 20° to about 90°, about 30° to about 90°, about 40° to about 90°, about 50° to about 90°, about 60° to about 90°, about 70° to about 90°, or about 80° to about 90° different than the first axis of the material.

In some embodiments, the material is compressive rolled at least three, at least 4, at least 5, at least 6, at least 7, at least 8, at least 9, at least 10, at least 11, at least 12 or more times wherein each pass through the compressive roller is along an axis of the material that differs from the axis of the material during the previous pass through the compressive roller and wherein pass through the compressive roller reduces the thickness of the material by at least about 0.1%, at least about 0.2%, at least about 0.3%, at least about 0.4%, at least about 0.5%, at least about 0.6%, at least about 0.7%, at least about 0.8%, at least about 0.9%, at least about 1.0%, at least about 1.2%, at least about 1.4%, at least about 1.6%, at least about 1.8%, or at least about 2%, for example, about 0.1% to about 5%, about 0.1% to about 4%, about 0.1% to about 3%, about 0.1% to about 2%, or about 0.1% to about 1%.

In some embodiments, the material is compression rolled in alternating axial directions.

In some embodiments, the distance between compressive rolls of the compressive rollers is less than about 95%, less than about 96%, less than about 98%, less than about 99%, or less than about 99.9% of the thickness of the material during each pass through the compressive rollers.

In some embodiments, the thickness of the material is larger than the roll-gap separation of the compressive roller.

The compressive rolled material is axially oriented at a draw ratio of at least 2, at least 3, at least 4, at least 5, at least 6, at least 7, at least 8, at least 9, at least 10, or at least 11, for example, a draw ratio of about 2, about 3, about 4, about 5, about 6, about 7, about 8, about 9, about 10, about 11, about 12, about 13, about 14, about 15, about 16, about 17, about 18 about 19, about 20 or any number therebetween.

In some embodiments, the compressive rolled material is axially oriented above the Tg but below the Tm of the polymer material.

In other embodiments, the compressive rolled material is axially oriented at a strain rate of at least about 50%/min, at least about 100%/min, at least about 150%/min, at least about 200%/min, at least about 250%/min, at least about 500%/min, at least about 1000%/min, or more.

In some embodiments, the axially oriented material includes a plurality axially aligned microfibrils and a plurality of nanofibrils linking laterally adjacent axially aligned microfibrils.

In some embodiments, the microfibrils have a length of about 1 μm to about 5 μm and the nanofibrils have a length less about 100 nm.

In some embodiments, the semicrystalline polymer material comprises at least one of homopolymers or copolymers of polyethene or polypropylene.

In other embodiments, the semicrystalline polymer material is processed solvent-free.

Other embodiments described herein relate to a high modulus and high strength polymer material produced by a method described herein.

In some embodiments, the high modulus and strength polymer material can be in the form of a plurality of fibers, non-woven fibers, woven fibers, or a composite thereof Still other embodiments described herein relate to a ballistic protection material that includes a high modulus and strength polymer material as described herein.

In some embodiments, the ballistic protection material can be formed into an article selected from the group consisting of helmets, body armor, vehicle armor, aircraft armor, watercraft armor, structure armor, equipment housing, blast protection panels, ballistic protection panels, and cargo containers.

DETAILED DESCRIPTION

Figure 1:
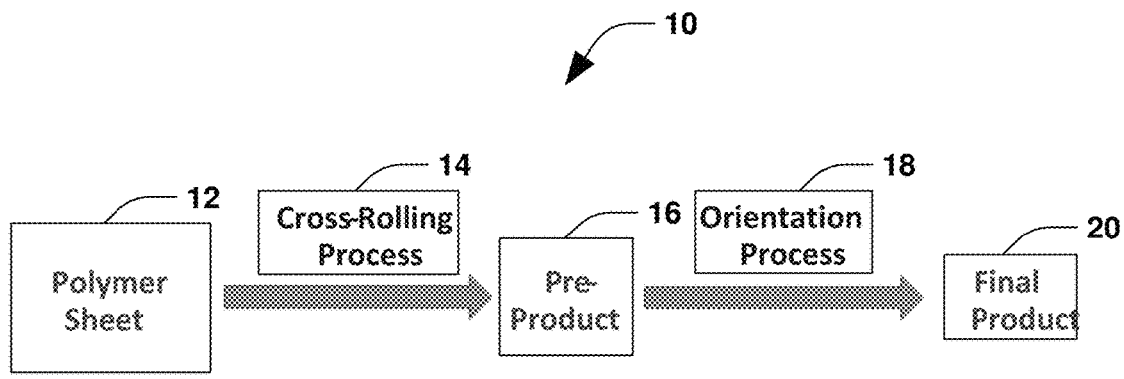
FIG. 1 illustrates schematic diagram of a two-stage process for producing high modulus and high strength polymer materials.

To facilitate the understanding of this invention, a number of terms are defined below. Terms defined herein have meanings as commonly understood by a person of ordinary skill in the areas relevant to the present invention. Terms such as "a", "an", and "the" are not intended to refer to only a singular entity but also plural entities and also includes the general class of which a specific example may be used for illustration. The terminology herein is used to describe specific aspects of the invention, but their usage does not delimit the invention, except as outlined in the claims.

Throughout the description, where compositions are described as having, including, or comprising, specific components, it is contemplated that compositions also consist essentially of, or consist of, the recited components. Similarly, where methods or processes are described as having, including, or comprising specific process steps, the processes also consist essentially of, or consist of, the recited processing steps. Further, it should be understood that the order of steps or order for performing certain actions is immaterial so long as the compositions and methods described herein remains operable. Moreover, two or more steps or actions can be conducted simultaneously.

As used herein, the term "about" or "approximately" refers to a quantity, level, value, number, frequency, percentage, dimension, size, amount, weight or length that varies by as much as 15%, 10%, 9%, 8%, 7%, 6%, 5%, 4%, 3%, 2% or 1% to a reference quantity, level, value, number, frequency, percentage, dimension, size, amount, weight or length. In one embodiment, the term "about" or "approximately" refers a range of quantity, level, value, number, frequency, percentage, dimension, size, amount, weight or length±15%, ±10%, ±9%, ±8%, ±7%, ±6%, ±5%, ±4%, ±3%, ±2%, or ±1% about a reference quantity, level, value, number, frequency, percentage, dimension, size, amount, weight or length.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation. "Optional" or "optionally" means that the subsequently described circumstance may or may not occur, so that the description includes instances where the circumstance occurs and instances where it does not.

Embodiments described herein relate to high elastomeric modulus and high strength polymer constructs and processes or methods of forming the constructs. It was found that when a polymeric material is compression rolled in multiaxial directions that results in the reduction of the overall thickness by about 0.1% to about 10% after each compression, followed by either uniaxial or multiaxial orientation of the compression rolled material, the mechanical properties, such as tensile strength and tensile modulus of the polymeric material, can be greatly enhanced. The enhancements of these properties are considerably greater than the original, non-compression rolled, material and most importantly considerably greater compared to materials having undergone to the same degree only uniaxial compression rolling followed by uniaxial orientation.

FIG. 1 illustrates a schematic diagram of a solvent-free method or process 10 of producing high modulus and strength polymer materials 20 from a semicrystalline polymer material. The method or process includes compressive rolling a semicrystalline polymer material in at least two different axial directions of the material and uniaxially orienting 18 at least portion of the compressive rolled material 16 to a draw ratio less than the ultimate elongation or the elongation % at break of the material.

In some embodiments, the semicrystalline polymer material can include a polyolefin, such as homopolymers, e.g., polyethylene, polypropylene, polybutylene, poly(methylpentene), etc., crystalline copolymers of ethylene and/or propylene with at least one member of other α-olefins, e.g., ethylene, propylene, butene, hexene, heptene, octene, decene, etc., where the content of the ethylene or propylene component therein is at least about 40%, at least about 50%, at least about 60%, at least about 70%, at least about 80%, at least about 90% or more, copolymers of ethylene, propylene, or the above with at least one member of other α-olefins with a polar monomer, e.g., vinyl acetate, acrylic acid, methyl acrylate, ethyl acrylate, butyl acrylate, methacrylic acid, methyl methacrylate, ethyl methacrylate, butyl methacrylate, etc., polyamide resins e.g., nylon-6, nylon-66, nylon-12, nylon-610, nylon-11, etc., thermoplastic polyester resins, e.g., polyethylene terephthalate, polybutylene terephthalate, etc., polyacetal resins, acrylonitrile-butadiene-styrene copolymer resin, polystyrene resin, polyvinyl chloride resin, and copolymers, blends, or mixtures of the foregoing.

Further, it is also possible to use modified polymers obtained by copolymerizing an unsaturated carboxylic acid such as maleic acid, acrylic acid, fumaric acid, etc. or derivatives thereof such as anhydrides, esters, etc. thereof, with the above-mentioned polymers, or those obtained by subjecting the above polymers to ionizing radiation treatment or crosslinking with a crosslinking agent.

In some embodiments, the semicrystalline polymer includes polyethylene or polypropylene having a degree of crystallinity of at least about 10%, at least about 20%, at least about 30%, at least about 40%, at least about 50%, at least about 60%, at least about 70%, at least about 80% or at least about 90%. For example, the polyethylene or polypropylene can have a degree of crystallinity of about 10% to about 90%, about 20% to about 90%, about 30% to about 90%, about 40% to about 90%, about 50% to about 90%, about 60% to about 90%, about 70% to about 90%, about 10% to about 80%, about 10% to about 70%, about 10% to about 60%, about 10% to about 50%, about 10% to about 40%, or about 10% to about 30%.

The semicrystalline polymer material can optionally include various fillers. Examples of such fillers are fiber-form fillers, such as glass fibers, partially formalized polyvinyl alcohol fibers, etc., flake-form fillers, such as mica, talc, etc., spherical fillers such as glass bead, etc., and amorphous fillers, such as calcium carbonate.

The semicrystalline polymer material can also optionally include extenders, coloring agents, flame-retardants, deterioration-preventing agents, antistatic agents, and lubricants.

The semicrystalline is initially shaped into a form 12 that can be compressive rolled on a roll mill. For example, the semicrystalline polymer material can be shaped into a slab, sheet, or the like 12 by any number of operations for working the semicrystalline polymer material while above its softening point. Such operations can include compression molding, injection molding, or extrusion. A semicrystalline polymer material formed into a slab, sheet, tape, ribbon, can be cooled below its softening temperature and processed by compressive cold rolling 14 in a rolling mill.

Figure 2:
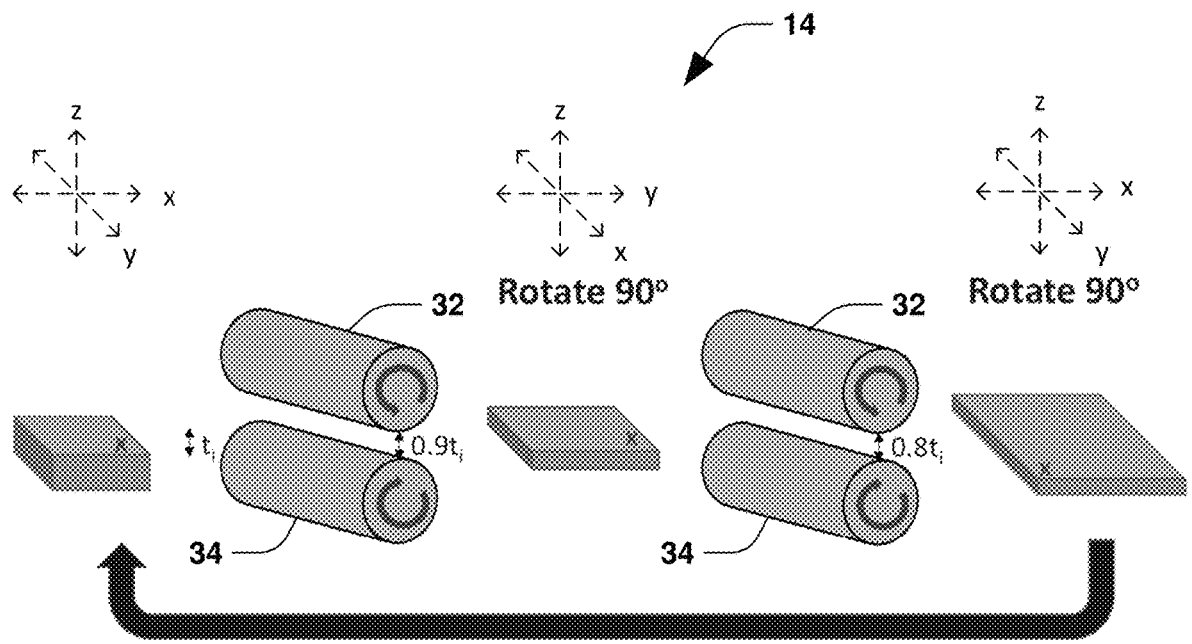
FIG. 2 illustrates a schematic diagram of a cross-rolling process of the two-stage process.

Referring to FIG. 2, which is a schematic diagram illustrating the compressive rolling process 14 of FIG. 1, two rolls, which are indicated at 32 and 34, of a rolling mill can be used to compressively roll a sheet or slab of the semicrystalline polymer material in at least two different axial directions of the material. The sheet of semicrystalline polymer material can extend within an x-y plane of an x-y-z coordinate system. Each sheet initially extends in the x-direction. The x-direction defines the length of the sheet and extends in the general direction of sheet rolling through the rolls 32, 34. The y-direction extends transverse, e.g., perpendicular, to the x-direction and defines the width of the sheet. The z-direction extends transverse, e.g., perpendicular, to both the x-direction and the y-direction and defines the height or thickness of the sheet.

The pair of rolls 32, 34 can be arranged in first direction (e.g., transverse or orthogonal) to the advancing direction or x direction of the sheet. In some embodiments, the sheet of semicrystalline polymer material makes a first pass in the direction x between a pair of rolls 32, 34 of a compressive roller to effect a reduction in thickness z of the material about 0.1% to less than about 60% (e.g., about 1% to less than 25%).

Thereafter, the sheet of semicrystalline polymer material makes a second pass between the rolls in a direction different (orthogonal or transverse) from the direction of the first pass to effect a further reduction in the thickness of the material about 0.1% to less than about 60% (e.g., about 1% to less than 25%). For example, the sheet of semicrystalline polymer material can be rotated such that rolling will be effected in a direction about 90° to the original direction or x-direction. To put it another way, the sheet is compressive rolled in a first direction parallel to the x axis of the sheet and in a second direction parallel to the y axis of the sheet.

Such a treatment effects biaxial orientation and produces may desirable mechanical properties including, for example, increased tensile strength, reduced haze, increased elastomeric modulus.

It will be appreciated the sheet of the semicrystalline polymer material can be rolled in the same direction more than one time prior to rolling the sheet in the different direction so as to effect reduction in the thickness of the sheet.

In some embodiments, the distance between the pair of rolls 32, 34 during the first pass is about 40% to about 99.9% of the thickness of the material and distance between the pair of rolls 32, 34 during the second pass different from the direction of the first pass is about is about 40% to about 99.9% of the thickness the material after the first pass.

In some embodiments, the material is compressive rolled along a first axis of the material and along a second axis of the material different than the first axis, wherein the first axis and the second axis are in substantially the same x-y plane.

In some embodiments the second axis is between about 5° to about 175° different than the first axis of the material.

In other embodiments, the second axis is about 15° to about 90°, about 20° to about 90°, about 30° to about 90°, about 40° to about 90°, about 50° to about 90°, about 60° to about 90°, about 70° to about 90°, or about 80° to about 90° different than the first axis of the material.

In some embodiments, the material is compressive rolled at least three, at least 4, at least 5, at least 6, at least 7, at least 8, at least 9, at least 10, at least 11, at least 12 or more times wherein each pass through the compressive roller is along an axis of the material that differs from the axis of the material during the previous pass through the compressive roller and wherein pass through the compressive roller reduces the thickness of the material by at least about 0.1%, at least about 0.2%, at least about 0.3%, at least about 0.4%, at least about 0.5%, at least about 0.6%, at least about 0.7%, at least about 0.8%, at least about 0.9%, at least about 1.0%, at least about 1.2%, at least about 1.4%, at least about 1.6%, at least about 1.8%, or at least about 2%, for example, about 0.1% to about 5%, about 0.1% to about 4%, about 0.1% to about 3%, about 0.1% to about 2%, or about 0.1% to about 1%.

In some embodiments, the material is compression rolled in alternating axial directions.

In some embodiments, the thickness of the material is larger than the roll-gap separation of the compressive roller.

In some embodiments, the distance between compressive rolls of the compressive rollers is less than about 95%, less than about 96%, less than about 98%, less than about 99%, or less than about 99.9% of the thickness of the material during each pass through the compressive rollers.

In other embodiments, the thickness of the sheet of semicrystalline polymer material is reduced by the compressive rolling processes at least about 25%, at least about 30%, at least about 35%, at least about 40%, at least about 45%, at least about 50%, at least about 55%, at least about 60%, at least about 70%, at least about 75%, at least about 80%, or at least about 85% of the original thickness, for example, the thickness of the sheet of semicrystalline polymer material is reduced about 35% to about 85%, about 40% to about 85%, about 45% to about 85%, about 50% to about 85%, about 55% to about 85%, about 60% to about 85%, about 65% to about 85%, about 70% to about 85%, about 75% to about 85%, or any percent of aforementioned ranges.

In some embodiments, the sheet of semicrystalline polymer material is compressive rolled at a temperature between the glass transition temperature (Tg) and the melting (Tm) of the material. For example, the sheet of semicrystalline polymer material can be cold rolled at a temperature between the glass transition temperature (Tg) and the melting (Tm) of the material.

Figure 3:
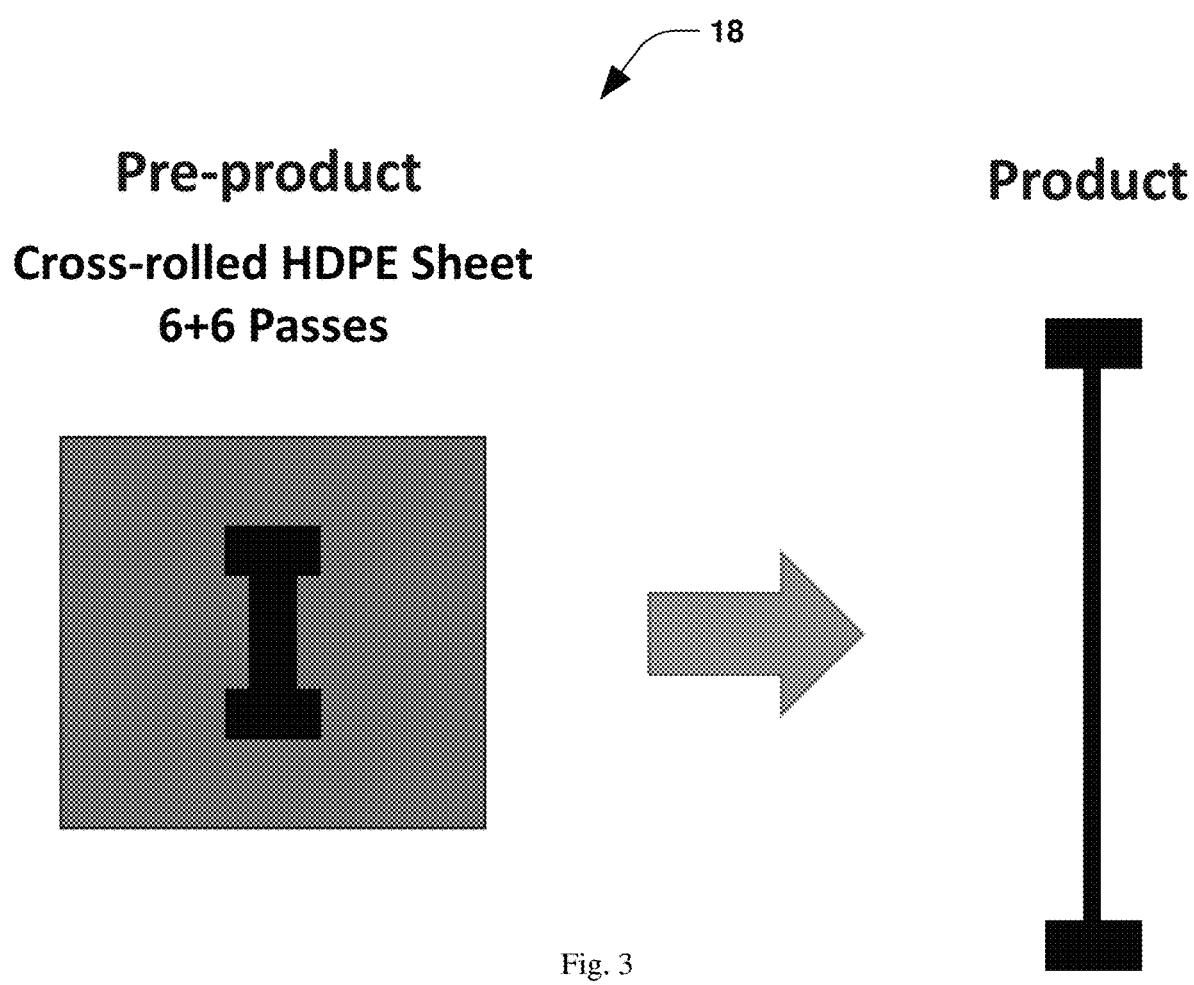
FIG. 3 illustrates a schematic diagram of orientation process of the two-stage process.

Following compressive rolling, as illustrated in FIG. 3, the compressive rolled sheet or at least a portion of the sheet can be uniaxially or multiaxially oriented or drawn less than the ultimate elongation or the elongation % at break of the material to form a high elastic modulus and high strength polymer constructs 20, such high elastic modulus and high strength polymer rods or filaments. In a preferred embodiment, the compressive rolled sheet is uniaxially oriented In some embodiments, various orienting, drawing, and/or stretching equipment may be employed to carry out the uniaxial or multiaxial orientation. For example, the compressive rolled sheet or portion of the compressive rolled sheet can be uniaxially drawn by, for example, roller drawing, radiation panel drawing, steam jet drawing, pin drawing, etc.

In some embodiments, the compressive rolled material can be uniaxially oriented at a draw ratio of at least 2, at least 3, at least 4, at least 5, at least 6, at least 7, at least 8, at least 9, at least 10, or at least 11, for example, a draw ratio of about 2, about 3, about 4, about 5, about 6, about 7, about 8, about 9, about 10, about 11, about 12, about 13, about 14, about 15, about 16, about 17, about 18 about 19, about 20 or any number therebetween.

In some embodiments, the compressive rolled material is uniaxially oriented at an elevated temperature above the Tg but below the Tm of the polymer material. The orientation process can be conducted about at and in the α-relaxation temperature range and below the Tm of the semicrystalline polymer material. For example, for a compressive rolled sheet of polyethylene, such as high density polyethylene (HDPE), the sheet or portion of the sheet can be uniaxially oriented or drawn at a temperature of about 70° C. and 110° C.

In other embodiments, the compressive rolled material is uniaxially oriented at a strain rate of at least about 50%/min, at least about 100%/min, at least about 150%/min, at least about 200%/min, at least about 250%/min, at least about 500%/min, at least about 1000%/min, or more.

In some embodiments, the uniaxially oriented material includes a plurality axially aligned microfibrils and a plurality of nanofibrils linking laterally adjacent axially aligned microfibrils.

In some embodiments, the microfibrils have a length of about 1 μm to about 5 μm and the nanofibrils have a length less about 100 nm.

In some embodiments, the semicrystalline polymer material comprises at least one of homopolymers or copolymers of polyethene or polypropylene.

In other embodiments, the semicrystalline polymer material is solvent-free and the process used to produce the high modulus and strength polymer material is solvent-free.

Other embodiments described herein relate to a high modulus and high strength polymer material produced by a method described herein.

In some embodiments, the high modulus and strength polymer material can be in the form of a plurality of fibers, non-woven fibers, woven fibers, or a composite thereof Still other embodiments described herein relate to a ballistic protection material that includes a high modulus and strength polymer material as described herein.

In some embodiments, the ballistic protection material can be formed into an article selected from the group consisting of helmets body armor, vehicle armor, aircraft armor, watercraft armor, structure armor, equipment housing, blast protection panels, ballistic protection panels, and cargo containers.

Example 1

This example describes a solid-state processing methodology using conventional HDPE to achieve a high-modulus and high-strength material with enhanced lateral adhesion. Our approach is a two-stage process, namely cross-rolling (Stage 1) and orientation (Stage 2). In addition, it is desirable to develop a process that requires relatively low levels of orientation while creating products with superior mechanical properties.

Experimental

Material

HDPE plaques (HDPE KPC) with dimension of 0.64× 30×30 cm were purchased from King Plastic Corporation. Based on the information provided by the supplier, HDPE KPC was prepared via compression molding without any additives. The density of HDPE KPC was 0.958 g/cm³. For the Stage 2, orientation process, the 6+6 cross-rolled samples were cut into a dog-bone geometry as suggested in ASTM-standard D1708 with the dimensions of 1.2×5.2× 15.0 mm.

Figure 4:
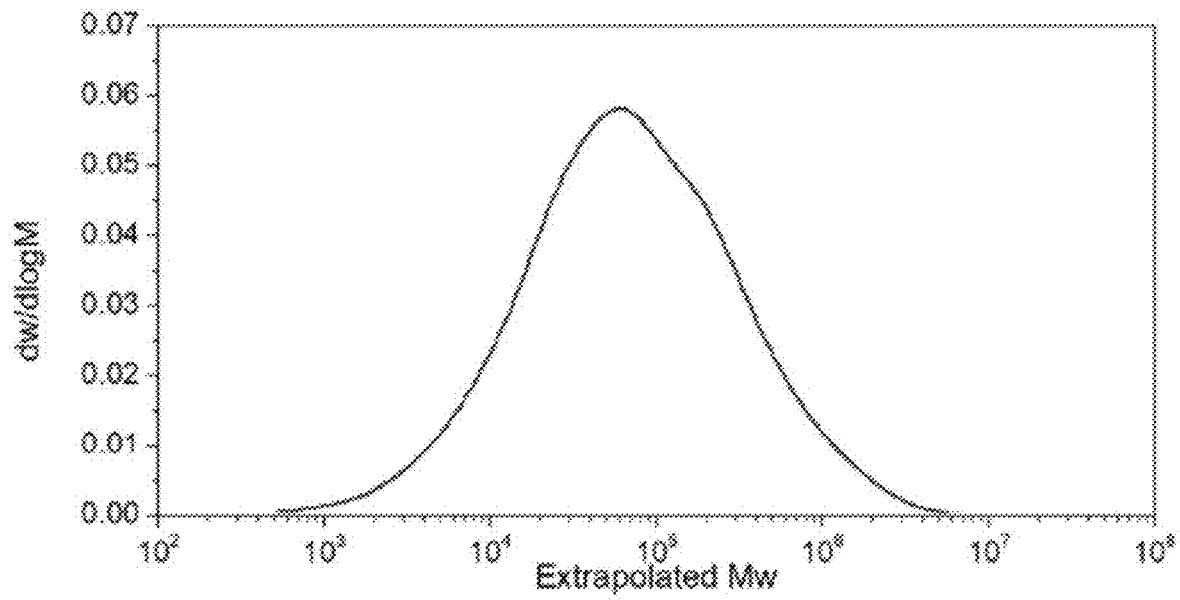
FIG. 4 illustrates molecular weight distribution of HDPE (King KPC) sheet as measure by Jordi Labs.

The molecular weight distribution of HDPE is shown in FIG. 4. Notably, HDPE showed a very broad molecular weight distribution with a calculated polydispersity $M_w/M_n$ of 9.6. The $M_w$, $M_n$, and $M_z$ values are summarized in Table 1. In addition, a high molecular tail ($M_z$) of greater than 1 MDa was estimated.

TABLE 1

Molecular weight distribution of HDPE

| Sample | Density (g/cm³) | $M_n$ | $M_w$ | $M_z$ | $M_w/M_n$ | $M_z/M_n$ |
|---|---|---|---|---|---|---|
| HDPE KPC | 0.958 | 17,700 | 169,000 | 1,030,000 | 9.6 | 58.1 |

Density

The densities of the cross-rolled plaque and oriented thin HDPE rods were measured using a density balance (Mettler Toledo XS205DU). Anhydrous ethanol was used as the medium during measurement.

Differential Scanning Calorimetry, DSC

Thermographs of the control, cross-rolled, and oriented HDPE were obtained using a TA Instruments Q2000 differential scanning calorimeter (DSC) by heating from 0 to 200° C. at 10° C./min. The melting point was defined as the peak value of the endothermic peak during the first heating scan. The crystallinity was determined using the following equation:

$$X_c = \frac{\Delta H_i}{\Delta H^0_{\frac{0}{i}}} \times 100\%$$

where $\Delta H_i$ is the heat of fusion obtained from the DSC thermograph, and $\Delta H^0$ is the heat of fusion of a perfect polyethylene crystal, taken as 293 J/g.

Wide Angle X-Ray Diffraction, WAXD

Bulk samples with various draw ratios were characterized at room temperature using a Rigaku 2D wide-angle X-ray diffraction (WAXD) unit with a Cu Kα radiation source (λ, =1.5405 Å). The scanning 2θ angle ranged between 0 and 40, with a step scanning of 1 for 1 s.

Small Angle X-Ray Scattering, SAXS

Small-angle X-ray scattering (SAXS) was conducted at the Advanced Materials and Liquid Crystal Institute (AMLCI) at Kent State University. The wavelength of the X-ray beam was determined as 0.155 nm. The scattering angle of the SAXS pattern was calibrated using silver behenate with a first-order scattering vector q ($q=4\lambda^{-1} \sin \theta$), where 2θ is the scattering angle) of 1.07 nm$^{-1}$.

Atomic Force Microscopy, AFM

The oriented HDPE rods were embedded in an epoxy resin/curing agent mixture for 24 h. The rod was then cut along the orientation direction using a microtome (Leica EM UC7) in liquid nitrogen. The local crystalline morphology was imaged by atomic force microscopy (AFM, Veeco Dimension Icon) in the tapping mode.

Scanning Election Microscopy

The microtomed samples were used to study the internal morphology of the damage evolution during solid-state orientation. The microtomed samples were sputter-coated with 6 nm gold (Quorum EMS150R ES) under vacuum and then analyzed by scanning electron microscopy (SEM, JEOL 6010LA)

Mechanical Measurements

All mechanical measurements were conducted under uniaxial tension on an MTS Alliance RT/30 instrument. For the Stage 2, orientation process, the 6+6 cross-rolled samples were cut into a dog-bone geometry as suggested in ASTM-standard D1708 with the dimensions of 1.2×5.2×15.0 mm. After orientation at elevated temperatures, the product was tested at room temperature. The gauge length was taken as the entire oriented thin-rod sample between the grips. To calculate the force, the cross-sectional area was measured using a micrometer at five different spots, and the average value was obtained. The average length and width for the oriented thin rod with a draw ratio of 11 were 0.6±0.03 mm and 1.0±0.04 mm, respectively.

Trouser Tear

The aforementioned oriented samples were used to study lateral adhesive properties. A modified trouser tear test was performed using MTS Alliance RT/30 at room temperature with a peeling rate of 2 cm/min along the orientation direction.

Results and Discussion

Two-Stage Processing-Stage 1: Cross-Rolling

Figure 5A:
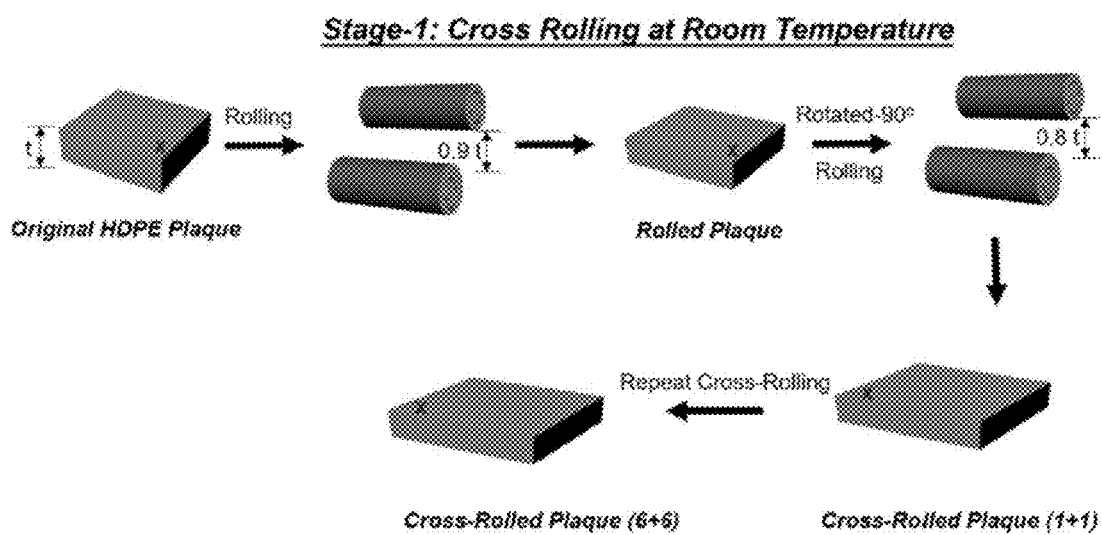
FIGS. 5(A-B) illustrate the processes FIG. 2 and FIG. 3 applied to a HDPE plaque. Schematic diagrams of the experimental procedure to fabricate oriented HDPE thin rod. (a) Stage 1—The original HDPE plaque (HDPE KPC) with thickness of 6.4 mm was rolled at room temperature and then rotated 90° for additional rolling to complete (1+1) passes. Cross-rolling was continued until the desired number of (6+6) passes were completed. The thickness of the final cross-rolled HDPE plaque was reduced to 1.2 mm. (b) Stage 2—The orientation process was performed at elevated temperature (T) by using a dog-bone sample from the cross-rolled plaque.

The fabrication procedure for creating the oriented HDPE rods is illustrated in FIG. 5. First, the HDPE plaque from King Plastics (HDPE KPC) with thickness around 0.64 cm was rolled at room temperature in the x-direction with roller gap about 0.9 of the original thickness. To achieve equibiaxial deformation, the plaque was rotated 90° in the y-direction with a roller gap 0.8 of its original thickness. After further rolling along the y-direction, two equibiaxial passes (1+1) were per-formed. The cross-rolling process was repeated continuously until the desired number of passes was achieved, as shown in FIG. 5(A). The thickness reduction of the (6+6) cross-rolled plaque was approximately 82% of its original thickness. The crystalline morphology of HDPE was transformed from a spherulitic structure to a textured crystalline structure along the rolling direction when the thickness reduction exceeded 75%. The pre-existing weak boundaries between spherulites were further weakened during the cross-rolling process, which caused the breakup of the spherulitic structure.

We studied the fracture behavior at −40° C. of (6+6) cross-rolled sheets at low temperatures of approximately −40° C. A large increase in ductility was observed when compared with the unrolled control samples. During uniaxial deformation, the cross-rolled material gradually yields without necking instability. The fracture strain at −40° C. around the first glass transition of HDPE, was 125%, which is unexpectedly high.

Figure 6A:
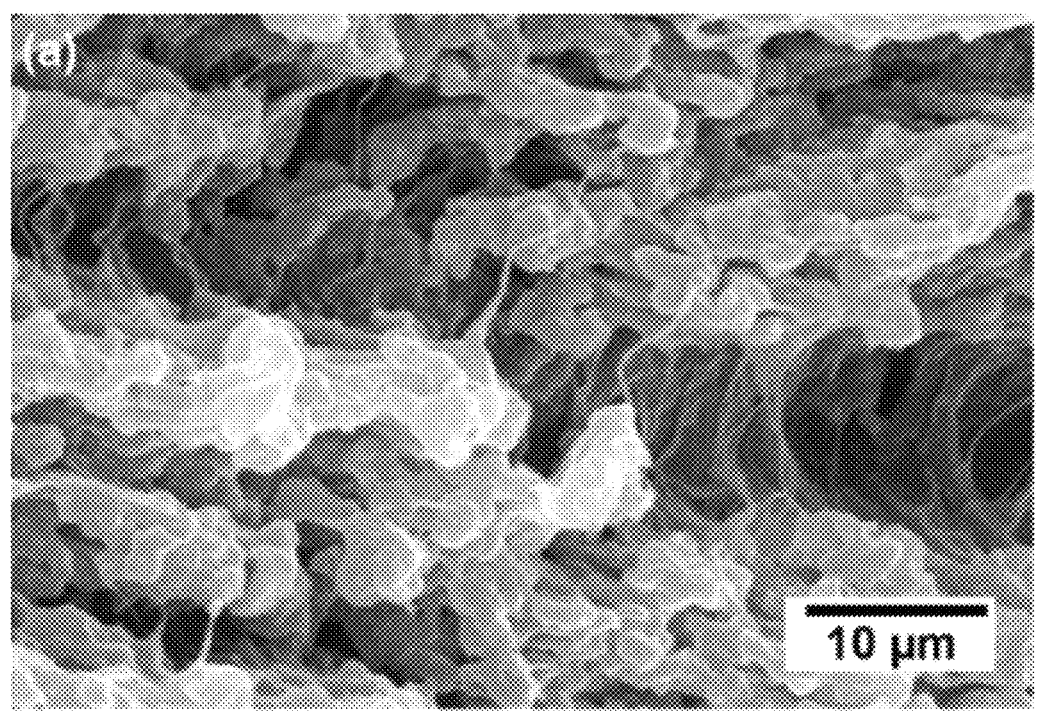
FIGS. 6(A-B) illustrate (a) SEM image of the damage zone at −40° C. prior to crack propagation showing delaminated layers between 5 and 10 μm thick and interconnecting fibrillar features. (b) SEM image of fracture surface during slow crack propagation at −40° C., showing a network of delaminated interconnecting nanofibers ranging between 0.3 and 0.6 μm in diameter.
Figure 6B:
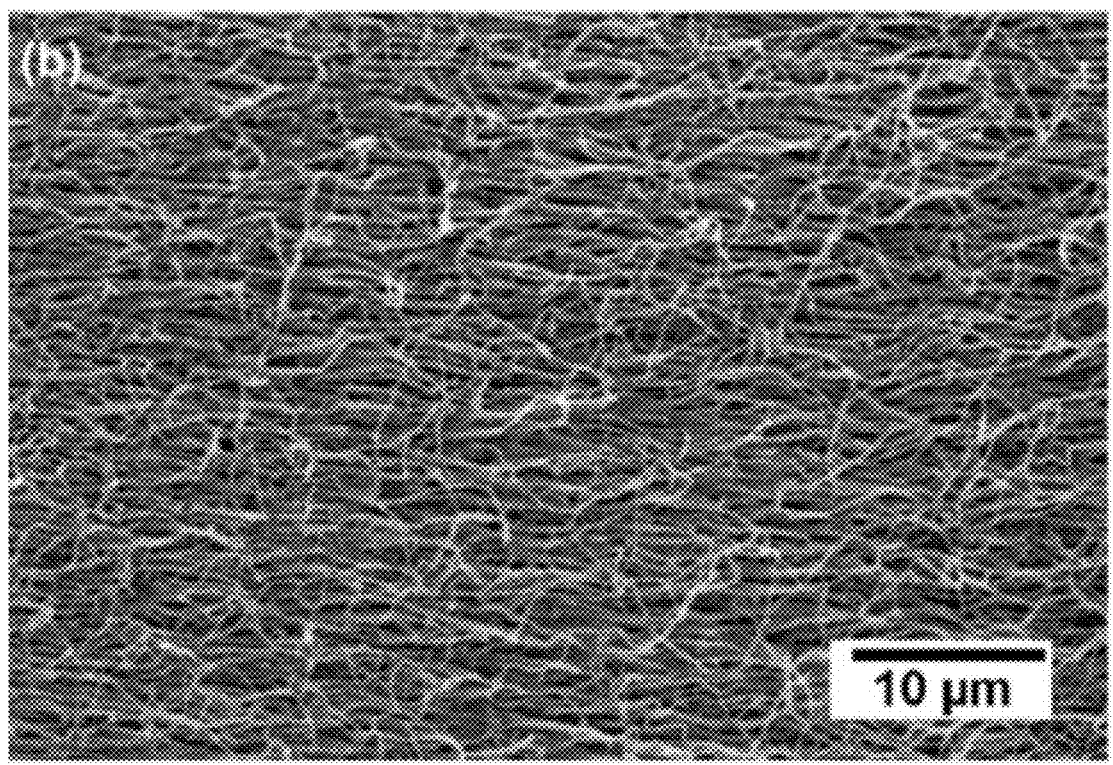
Figure 7A:
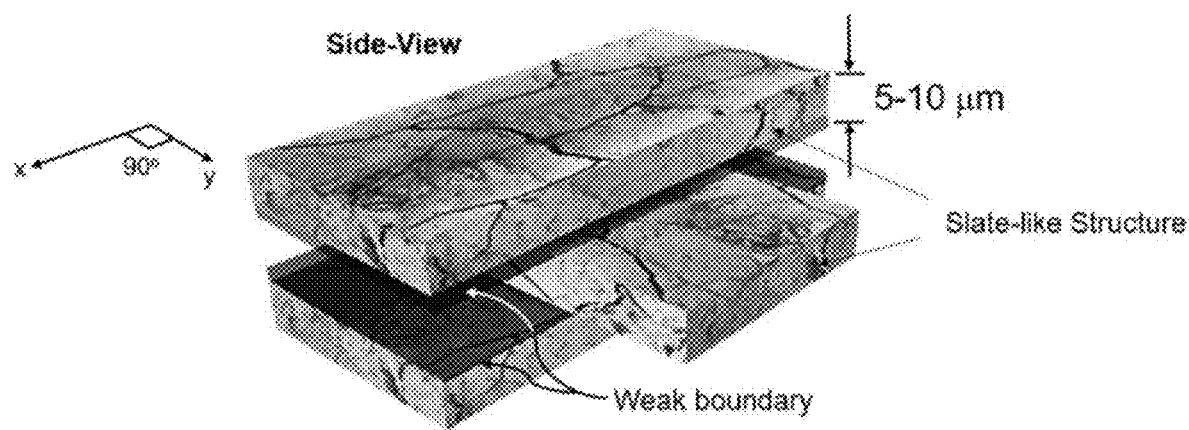
FIGS. 7(A-B) illustrate sketches of morphology for cross-rolled HDPE plaque. (a) Delaminated slate-like structure indicating the weak boundary, xy, between slates as a result of cross-rolling. (b) Top view of a slate showing additional weak boundaries in the slate-like structure after cross-rolling originating from pre-existing spherulitic morphology in the plaque.
Figure 7B:
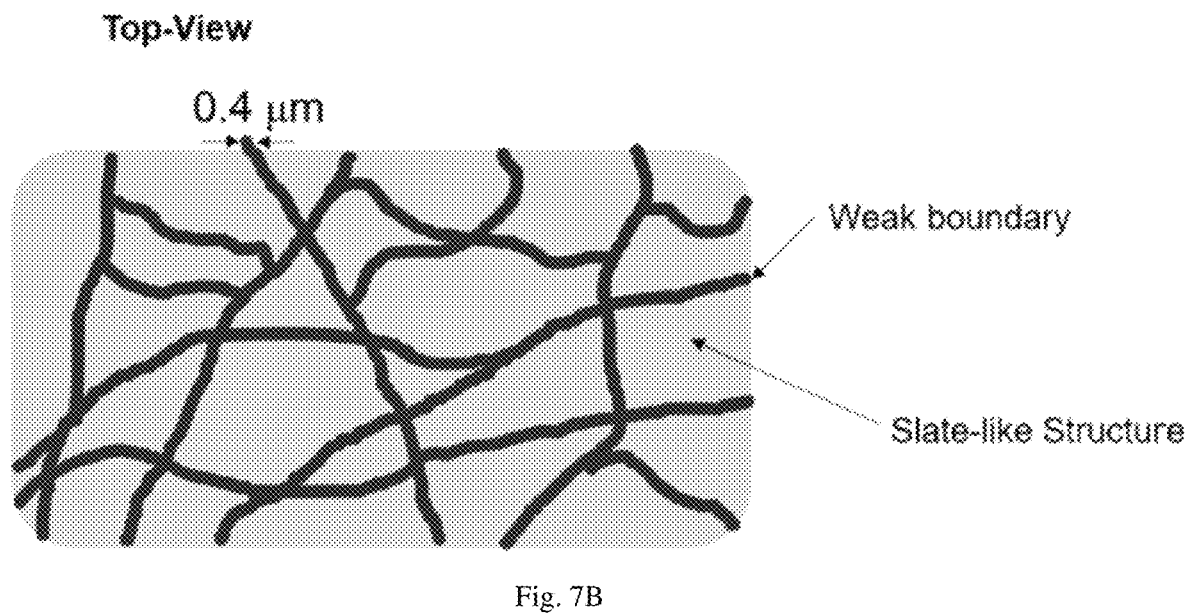

In FIG. 6, the cryogenic fracture surfaces are shown, which emphasize the delamination along weak boundaries. As previously noted, these weak boundaries originate in both the undeformed and cross-rolled materials. The failure and fracture SEM studies at these low temperatures suggested two distinct delamination mechanisms. In the static pre-fractured damage zone, as shown in FIG. 6(A), irregular layers were observed between 5 and 10 μm thick and were strongly interconnected by irregular fibrillar material. This slate-like structure, which results from cross rolling, is mechanically anisotropic. In the x-y directions, weaker planes parallel to the x and y directions were created. A second delamination mechanism is also clearly seen from the fracture morphology during crack propagation, as shown in FIG. 6(B), and is best described as a three-dimensional nanofiber network, which probably resulted from the delamination of weak spherulitic boundaries. that preexisted in the HDPE plaque before cross-rolling. The observed fiber diameters were in the sub-micron range averaging around 0.3-0.6 μm. A schematic summarizing these structural observations is presented in FIG. 7.

Two-Stage Processing-Stage 2: Orientation at Elevated Temperature

Figure 5B:
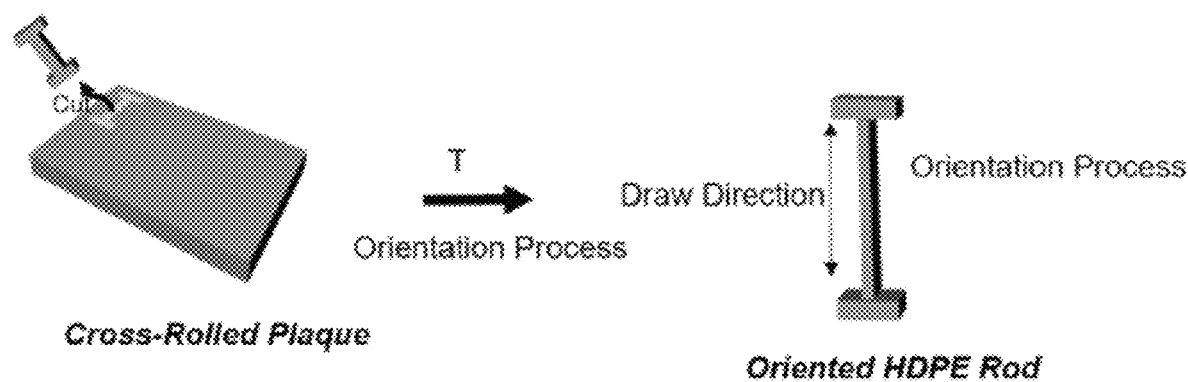

The (6+6) cross-rolled HDPE sample obtained from Stage 1 was subjected to uniaxial tensile orientation at elevated temperatures. As shown in FIG. 5(B), the goal was to obtain a high crystalline orientation. The orientation of these samples was conducted at temperatures between 70° C. and 110° C. at a constant strain rate of 250%/min.

Figure 8A:
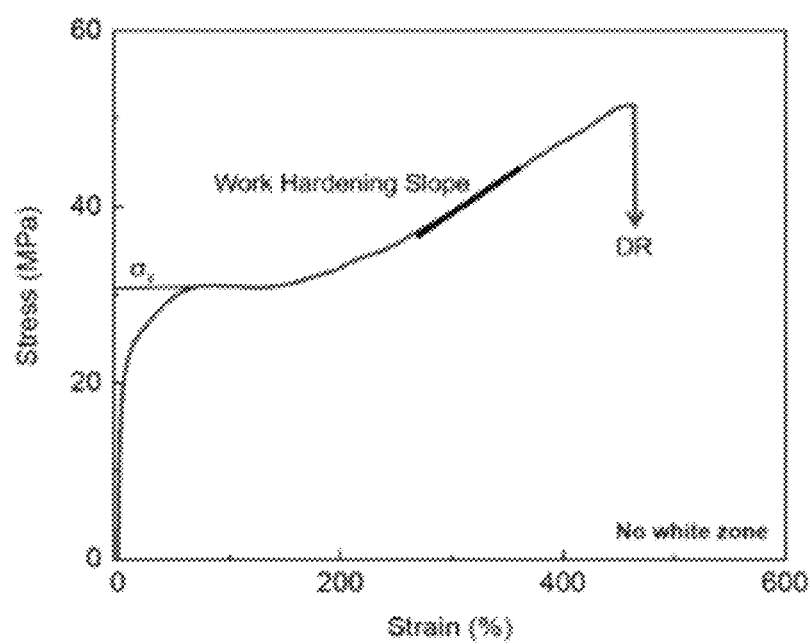
FIGS. 8(A-B) illustrate (a) Stage 2—Stress-strain curve during orientation of cross-rolled sample at room temperature obtained at a strain rate of 250%/min. The yield stress ($\sigma_y$), the work hardening slope and the maximum draw ratio are summarized in Table 2. (b) Enlarged stress-strain curve of this cross-rolled sample defining the secant moduli measured at one and two percent strain.

To understand the mechanical behavior during the orientation of the cross-rolled material at elevated temperatures, the orientation was first performed at room temperature for comparison. The stress-strain curve shown in FIG. 8(A) for a (6+6) cross-rolled plaque drawn at room temperature exhibited gradual yielding, followed by cold drawing. No necking instability was observed, and fracture occurred at a draw ratio of five (DR=5). It is important to note that, at the end of the flat drawing region, significant work hardening occurred prior to fracture.

Figure 8B:
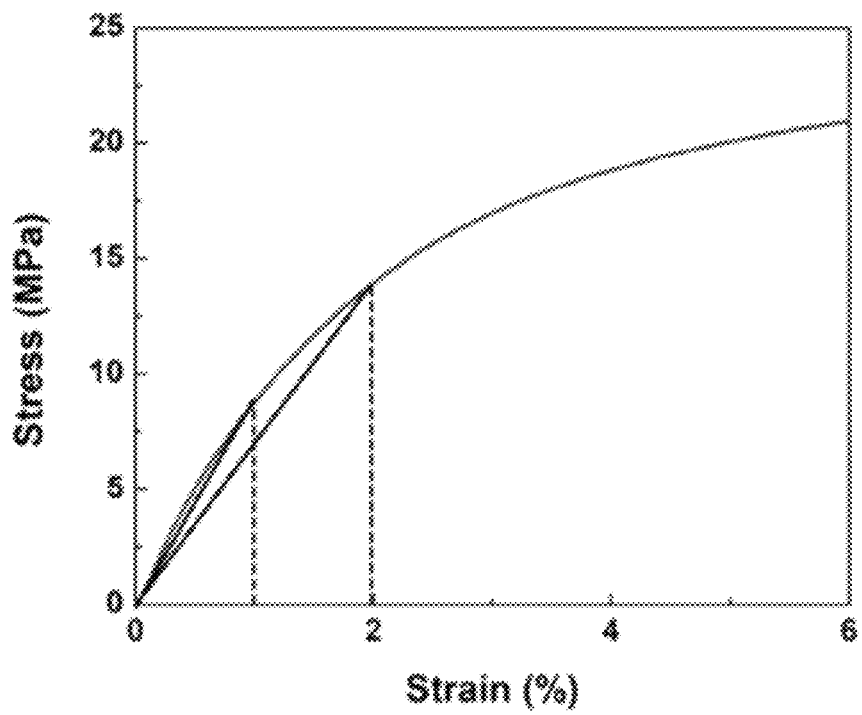

Typical unoriented injection-molded HDPE yields abruptly in uniaxial tension owing to necking instability followed by a large flat cold drawing zone accompanied by a relatively small work-hardening region prior to fracture. FIG. 8(B) shows a low-strain enlargement in FIG. 8(A) to illustrate the definition of the secant modulus.

Figure 9:
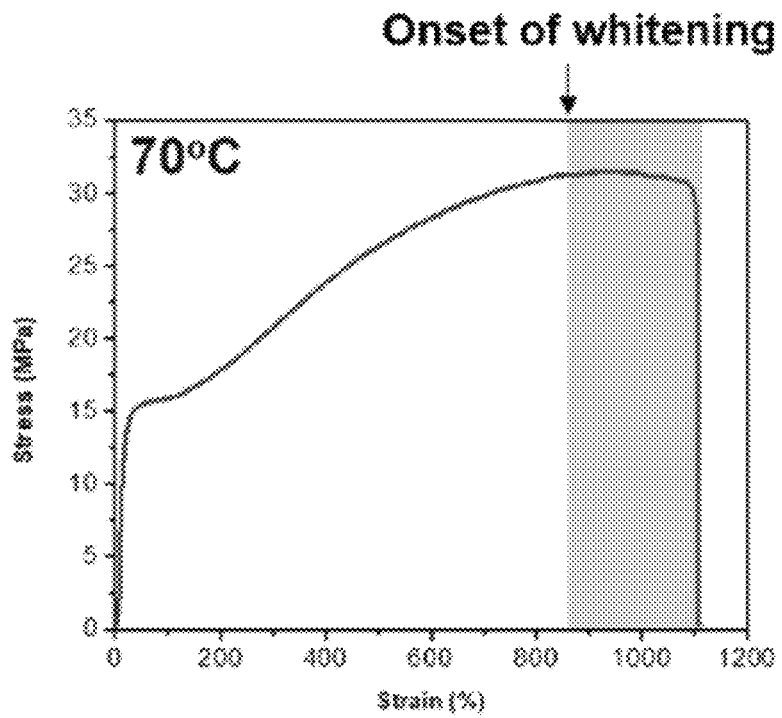
FIG. 9 illustrates Stage 2—Stress-strain curves of cross-rolled samples at elevated temperatures during orientation. The curves were analyzed in Table 2 according to the property definitions in FIG. 8S.
Figure 9:
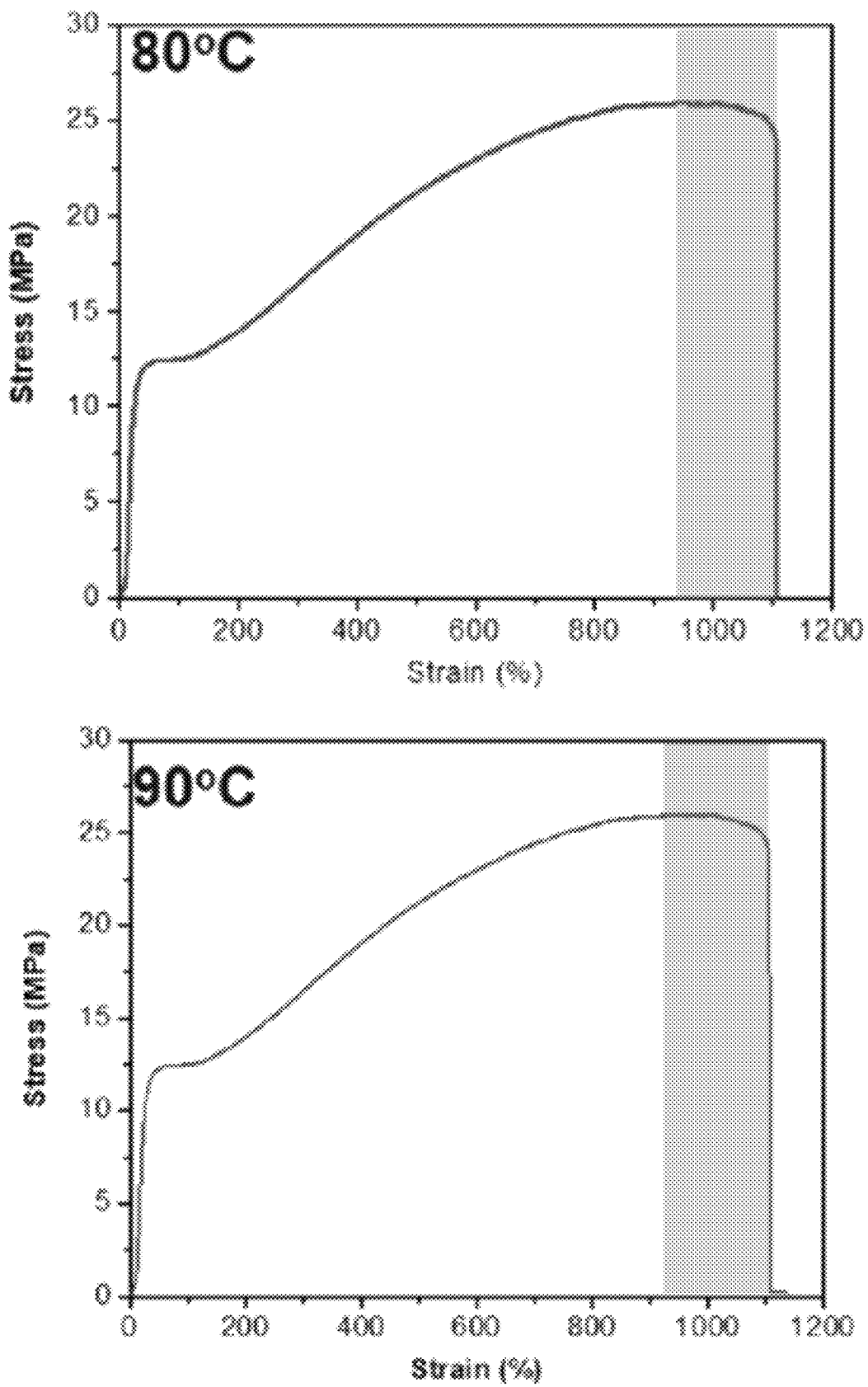
Figure 9:
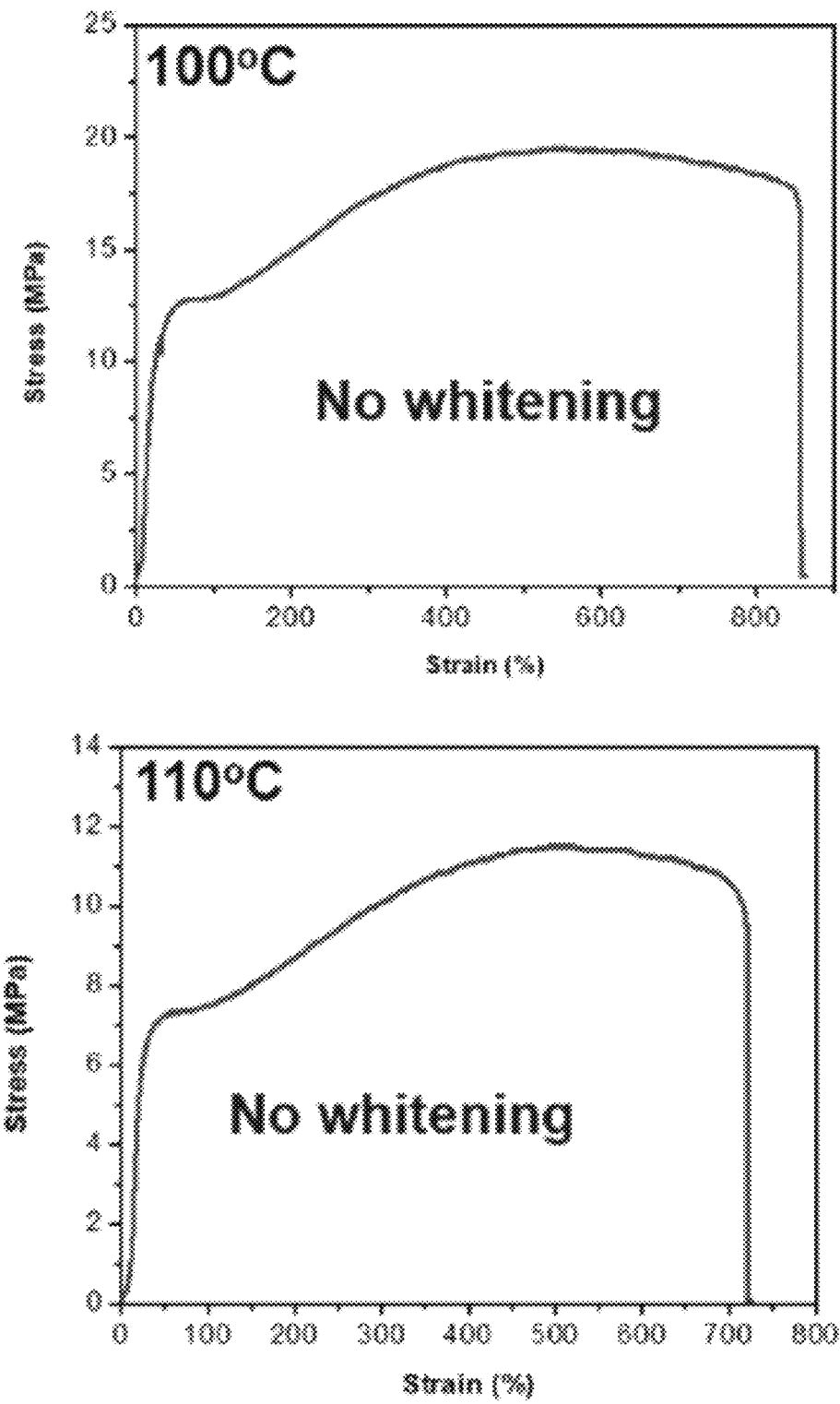
Figure 10A:
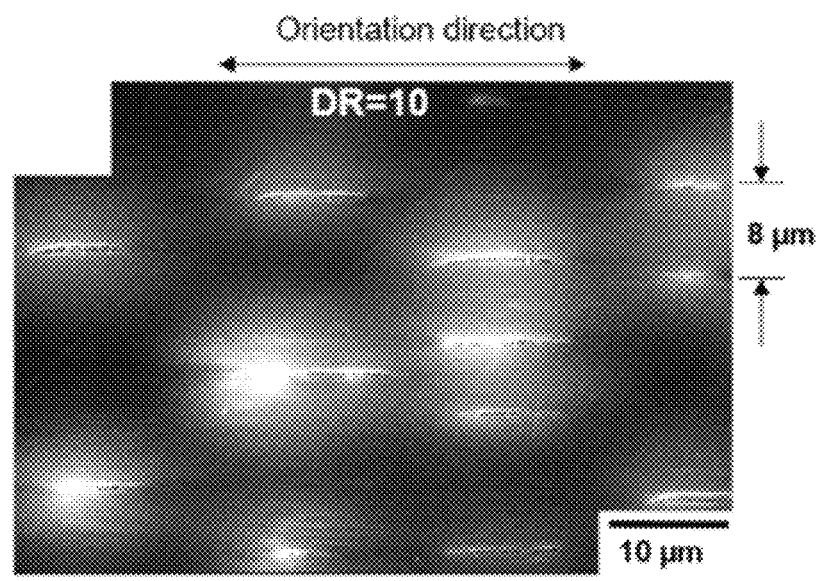
FIGS. 10(A-B) illustrate SEM micrographs of the oriented thin rods at (a) DR=10 and (b) DR=11.
In FIG. 10(b), craze-like microstructures 5-20 μm apart parallel to the direction of orientation are clearly indicated. These crazes contain nanofibrils around 80 nm in diameter. Thin oriented structures between 0.3 and 0.6 µm thick are also seen between aligned white boundaries.
Figure 10B:
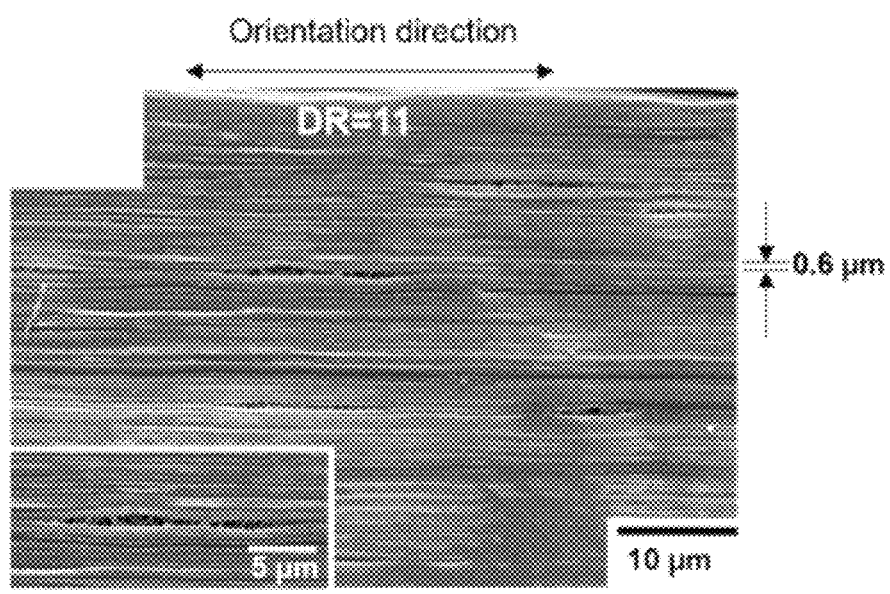

The orientation process (Stage 2) was conducted near and in the α-relaxation temperature region between 70° C. and 110° C. As shown in FIG. 9, at all five temperatures studied, gradual yielding occurred, followed by a relatively short drawing region. However, the strain in the work-hardening regions and fracture strains increased substantially compared to the room-temperature behavior. The mechanical properties are listed in Table 2. Surprisingly, the samples oriented at 70° C., 80° C., and 90° C. showed considerable whitening prior to fracture. This is due to dilatational and shear stresses in the material during uniaxial tensile deformation, which causes delamination at weak boundaries. Whitening started at approximately DR=9 and intensified until the fracture. In FIG. 10, this is further explained by the increase in craze-like void formation as the strain increases beyond DR=9 prior to fracture. The samples oriented at 100 and 110° C. did not whiten and were transparent, indicating that the spherulitic morphology was destroyed during cross-rolling. The remaining crystallinity was composed of oriented crystalline scattering units below the visible-light wavelengths.

TABLE 2

Summary of mechanical data from FIGS. 8 and 9 describing optimum orientation conditions for Stage 2 processing at elevated temperature

| Orientation temperature (° C.) | Secant Modulus at 2% (MPa) | Yield Stress $\sigma_y$ (MPa) | Work Hardening Slope (MPa) | Onset Whitening Strain (%) | Maximum Draw Ratio (DR) |
|---|---|---|---|---|---|
| 25 | 6.75 | 31.1 | 7.7 | N/A | 5.0 |
| 70 | 0.98 | 15.6 | 2.9 | 890 | 11.5 |
| 80 | 0.77 | 12.3 | 2.6 | 910 | 11.0 |
| 90 | 0.84 | 12.4 | 2.4 | 910 | 12.0 |
| 100 | 0.80 | 12.8 | 2.2 | N/A | 9.0 |
| 110 | 0.63 | 7.3 | 1.4 | N/A | 7.0 |

Samples oriented at 90° C. were chosen for detailed investigation. When comparing with other orientation temperatures, orientation at 90° C. showed the most uniform whitened appearance and the highest drawability prior to fracture at DR=12. The SEM micrographs shown in FIG. 10(A) at DR=10 suggest aligned structures between voids of approximately 5-201 µm thickness. This scale is similar to the slate thickness illustrated in FIG. 7(A) and supports the observation that delamination initiated at the weak boundaries resulting from cross-rolling. At DR=11 (FIG. 10(B)), elongated craze-like features within the weak boundaries are clearly visible parallel to the draw direction. Inside these crazes are numerous nanofibrils, approximately 80 nm in diameter, mostly perpendicular to the draw direction. In addition, thinner structures between 0.3 and 0.6 µm thick are also seen between the aligned white lines.

Figure 11A:
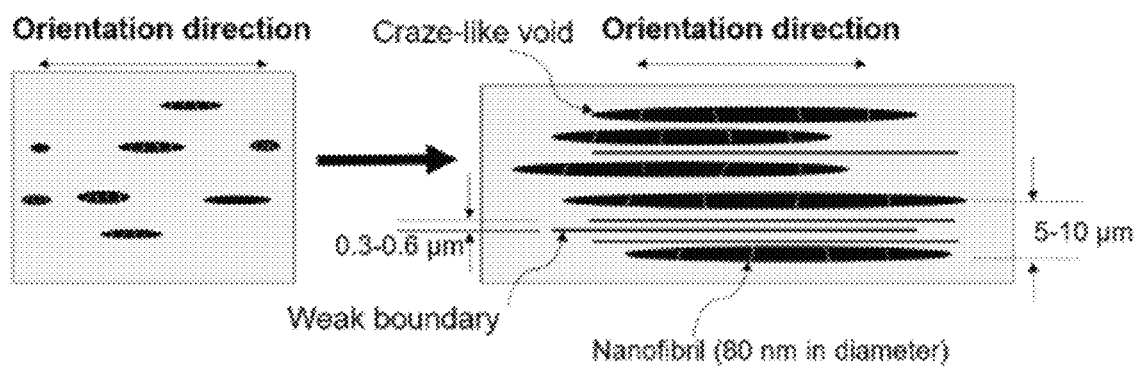
FIGS. 11(A-C) illustrate (a) Sketches summarizing the structural features observed in FIG. 10 (a,b) with increasing draw ratio. These features originated at weak boundaries (b,c). Detailed sketch shows the oriented micro- and nanofibers between the crazes. The thickness of the oriented micro- and nanofibers are between 5-10 µm and 0.3-0.6 µm, respectively.
Figures 11B, 11C:
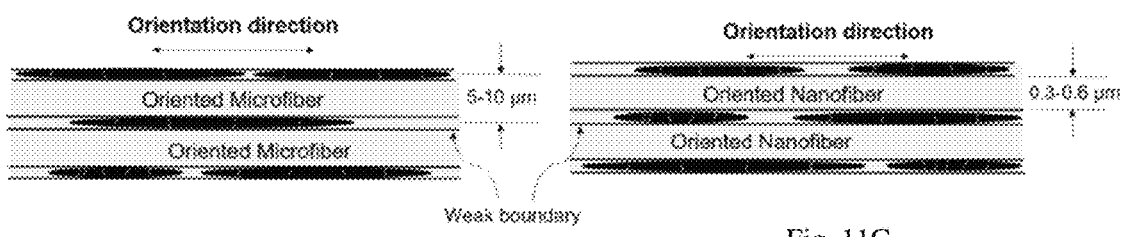
Figure 12:
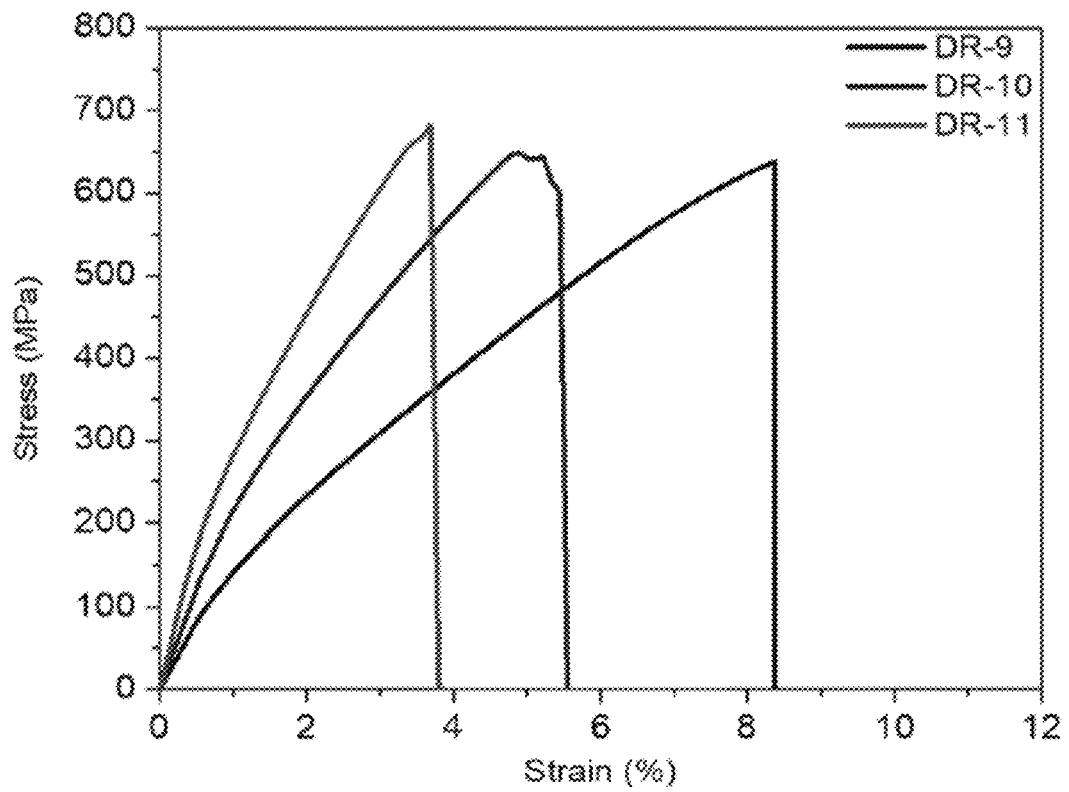
FIG. 12 illustrates stress-strain curves of oriented thin rods, the product, at room temperature with DR=9, 10 and 11. The samples were cross-rolled (Stage 1, 6×6) and then oriented at 90° C. (Stage 2).

FIG. 11(A) summarizes these observations in sketches with increasing draw ratios. FIGS. 11(B) and (C) show the detailed features of the observed oriented microfibers and nanofibers, respectively. It should be noted that the decrease in density from DR=9 to DR=11, summarized in Table 3, confirms that significant voiding occurred in Stage 2 with increasing draw ratio prior to fracture. The polymer between the crazed boundaries was now oriented into a fibrillar structure.

TABLE 3

Mechanical Properties of thin oriented rods at room temperature-the Product

| Orientation Temperature (° C.) | Draw Ratio | Density (g/cm³) | Tangent Modulus (GPa) | Secant Modulus at 1% (GPa) | Tensile Strength (MPa) | Strain at Break (%) |
|---|---|---|---|---|---|---|
| Cross-Rolled (6 + 6) Control | Cross-Rolled (6 + 6) Control | 0.943 | 1 | 0.9 | 51 | 460.0 |
| 90 | 9 | 0.941 | 21 | 14.1 | 640 | 8.7 |
| 90 | 10 | 0.938 | 31 | 21.4 | 650 | 5.5 |
| 90 | 11 | 0.930 | 37 | 27.9 | 680 | 3.7 |
| 100 | 8 | N/A | 17 | 14.8 | 639 | 7.3 |
| 110 | 7.5 | N/A | 15 | 13.5 | 546 | 7.8 |

Tensile Properties of Oriented Thin Rods at Room Temperature—the Product

Figure 13A:
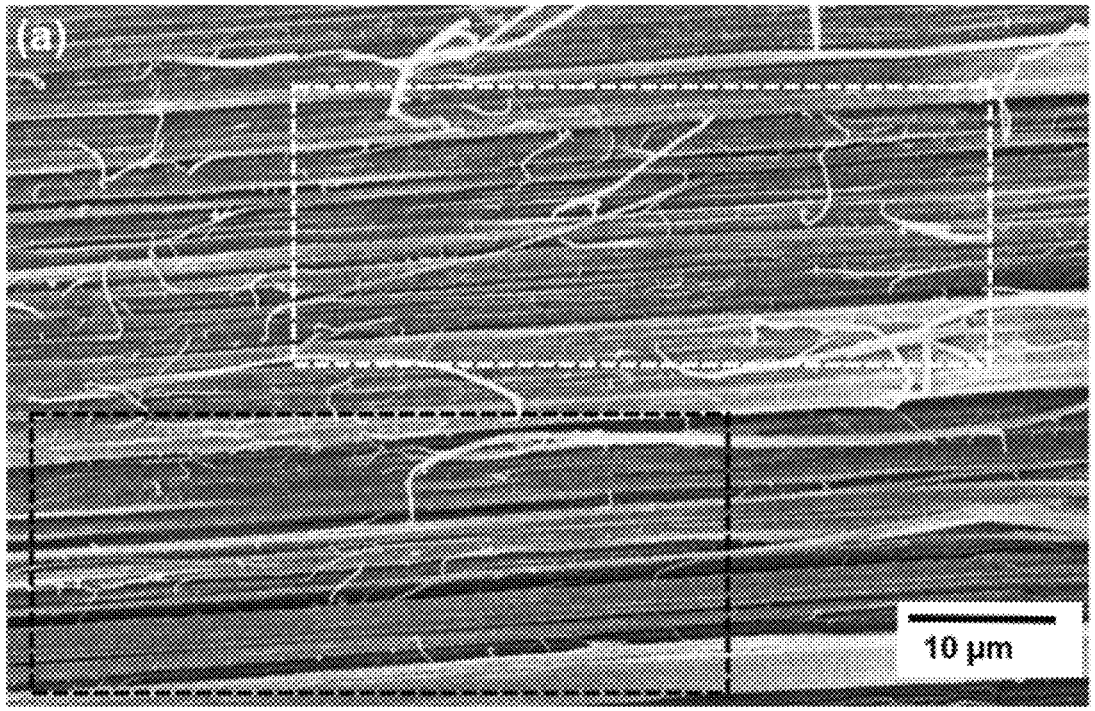
FIGS. 13(A-B) illustrates (a) fracture surface morphology at room temperature of oriented thin rod with DR 11. Fractured occurred at 4% strain. Magnified FIGS. 13(*b*) and (*c*) show thick crazes (black box) and thin sub-micron crazes (white box). Out-of-plane tie fibers are also indicated, suggesting that the overall oriented structure behaves mechanically as a network.
Figure 13B:
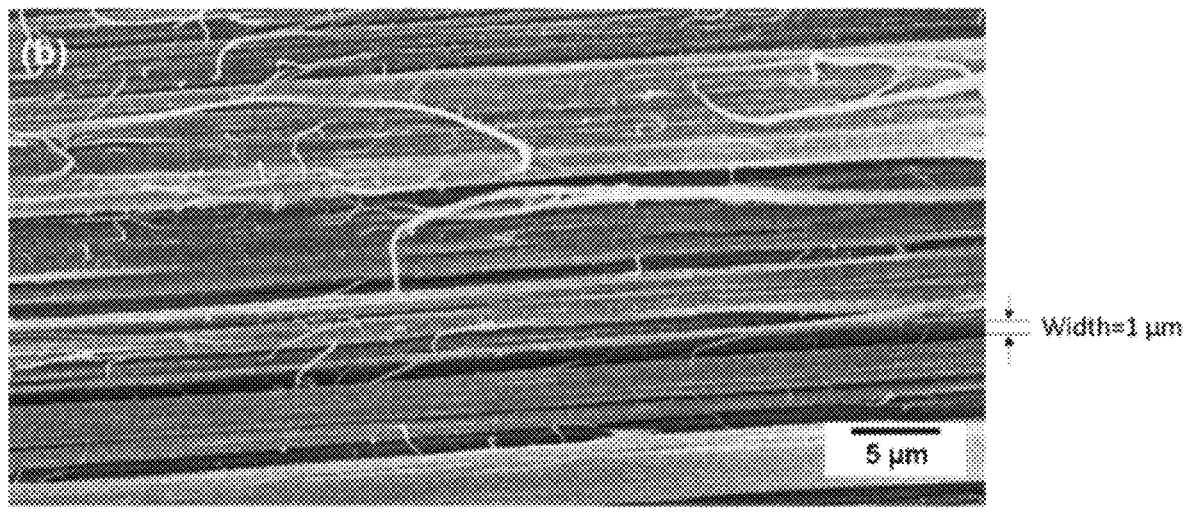
Figure 13C:
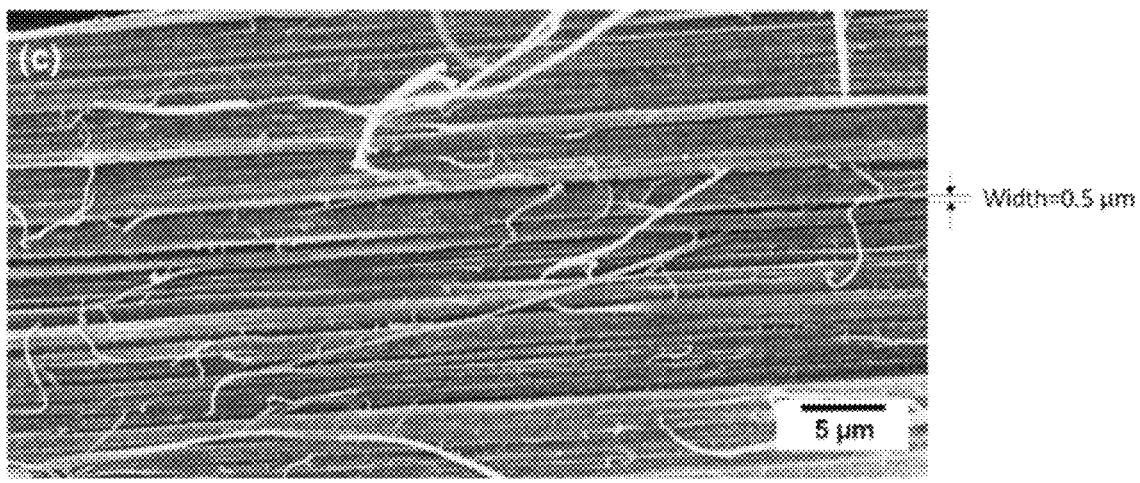
Figure 14:
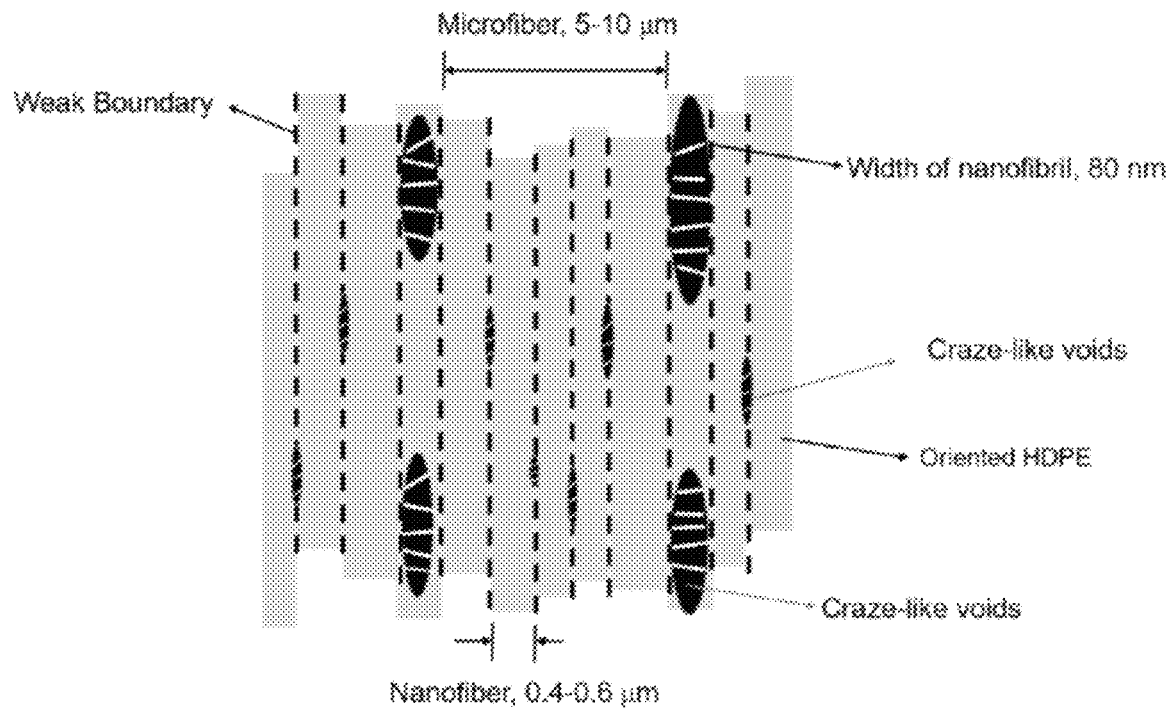
FIG. 14 illustrates detailed sketch of the hierarchical structure of an oriented thin rod showing the morphology of a microfiber containing large and small crazes is shown. The crazes originated from weak boundaries during Stage 1 and Stage 2 processing.

FIG. 9 shows the stress-strain curves of the oriented thin rods, "the product," at room temperature. The mechanical properties are summarized in Table 3 and compared with those of unoriented (6+6) cross-rolled HDPE. It is interesting and unexpected that the tangent modulus increased significantly from 1.0 to 37 GPa and the tensile strength increased from 51 to 680 MPa for samples that were oriented at 90° C. at various draw ratios and exhibited crazing. However, the samples oriented at both 100 and 110° C. which did not craze had inferior mechanical properties. In FIG. 13(A), a typical SEM fracture surface is shown as an oriented thin rod with DR=11 that fractured at approximately 4% strain at room temperature. The enlarged (white rectangle FIG. 13(B) emphasizes a large craze morphology that results from the weak boundaries created by cross-rolling. In addition, in enlarged FIG. 13(C), (the black rectangle), profusion of thinner and shorter crazes is observed. The distance between these crazes is in the submicron range. We speculate that these smaller crazes were initiated in the later stages of orientation in the whitening region in Stage 2 and resulted from the weak boundaries that existed in the original spherulitic structure. In addition, as shown in FIG. 13(A), the out-of-plane fibers suggest that the overall hierarchical structure acts as a network, thus enhancing adhesion perpendicular to the direction of orientation.

FIG. 11 is a summarized sketch of the hierarchical morphology resulting from cross-rolling (Stage 1), followed by orientation (Stage 2). As stated previously, microfibers approximately 5-10 μm in diameter formed between large crazes during delamination from weak boundaries resulting from cross-rolling, that is, a slate-like structure. The nanofibers between smaller crazes also resulted from delamination at weak boundaries, which possibly originated from the process-weakened spherulitic interfaces that existed in the original HDPE plaques.

Commercial UHWMPE fibers processed by gel spinning are available in various thicknesses. As the fiber diameter increased, the stiffness decreased in the 40 GPa range. Notably, the oriented thin rods described in this paper are twenty times thicker at comparable stiffnesses.

Adhesion Between Microfibers

Figure 15A:
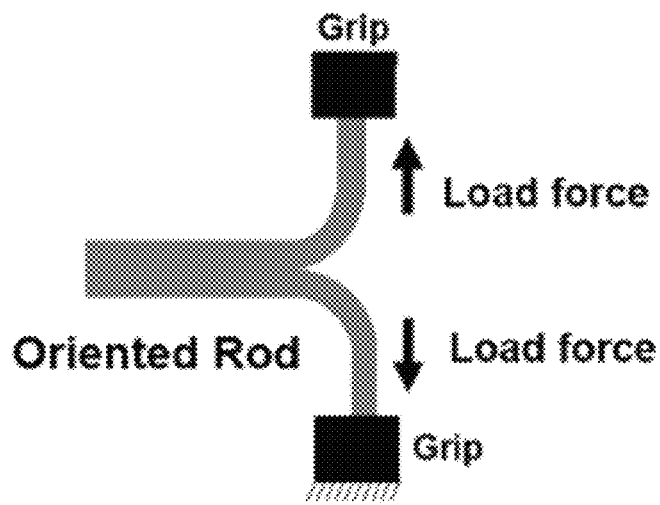
FIGS. 15(A-B) illustrate (a) Schematic diagram of the modified trouser tear method. (b) Force-displacement curve for the oriented thin rod with DR=11. The steady propagating load force was 8.2 N.
Figure 15B:
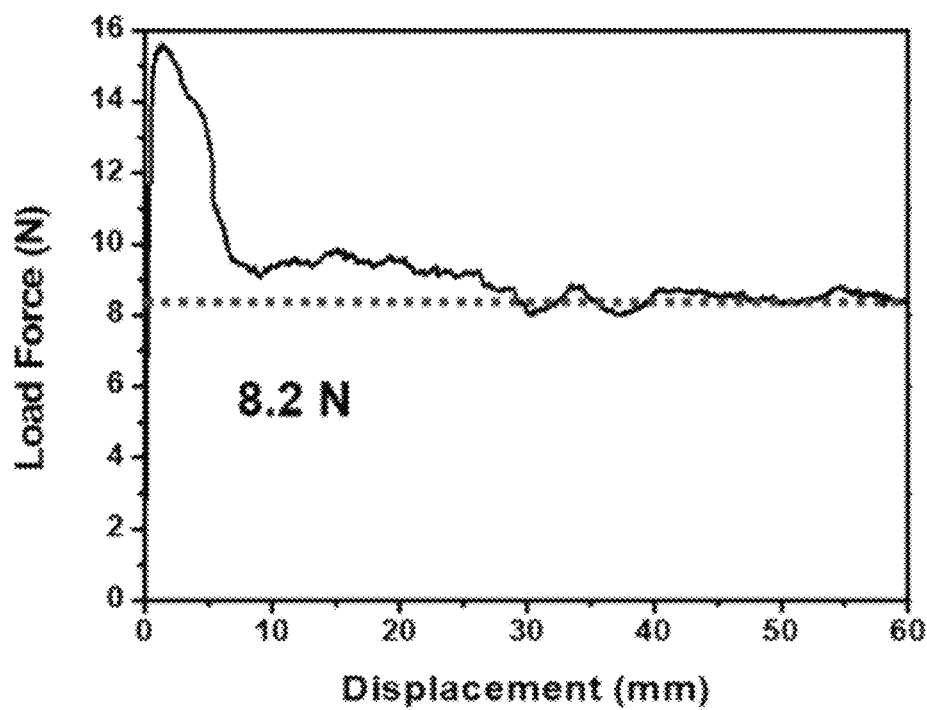
Figure 16:
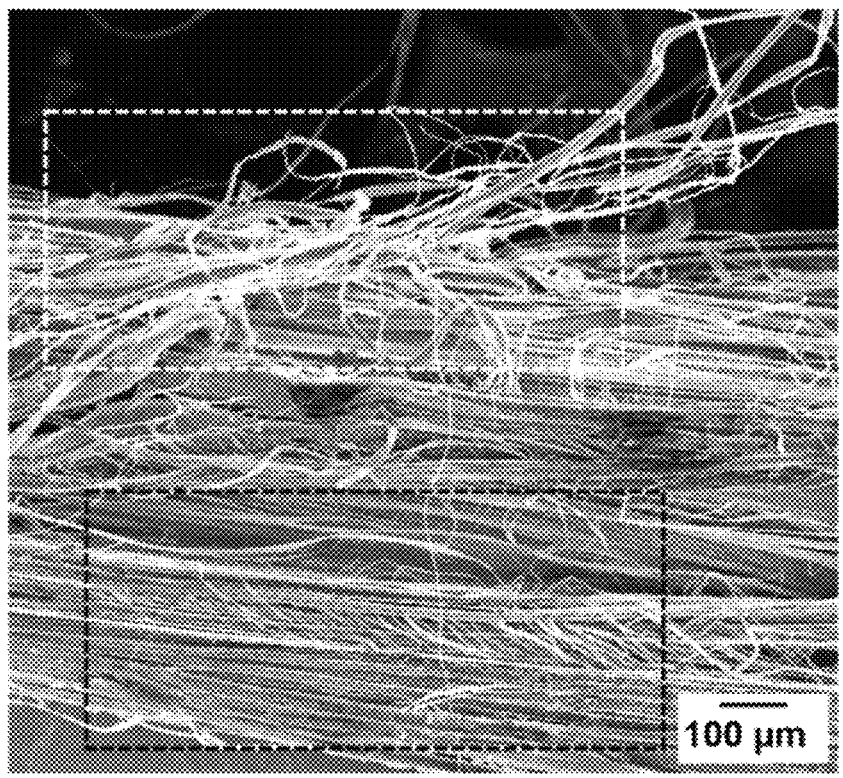
FIG. 16 illustrates SEM micrographs of tear fracture surface showing out of fracture plane delaminated microfibers (white box) and in-plane delaminated microfibers (black box). A profuse craze morphology between the fibrillary network is again indicated.
Figures 17A, 17B, 17C:
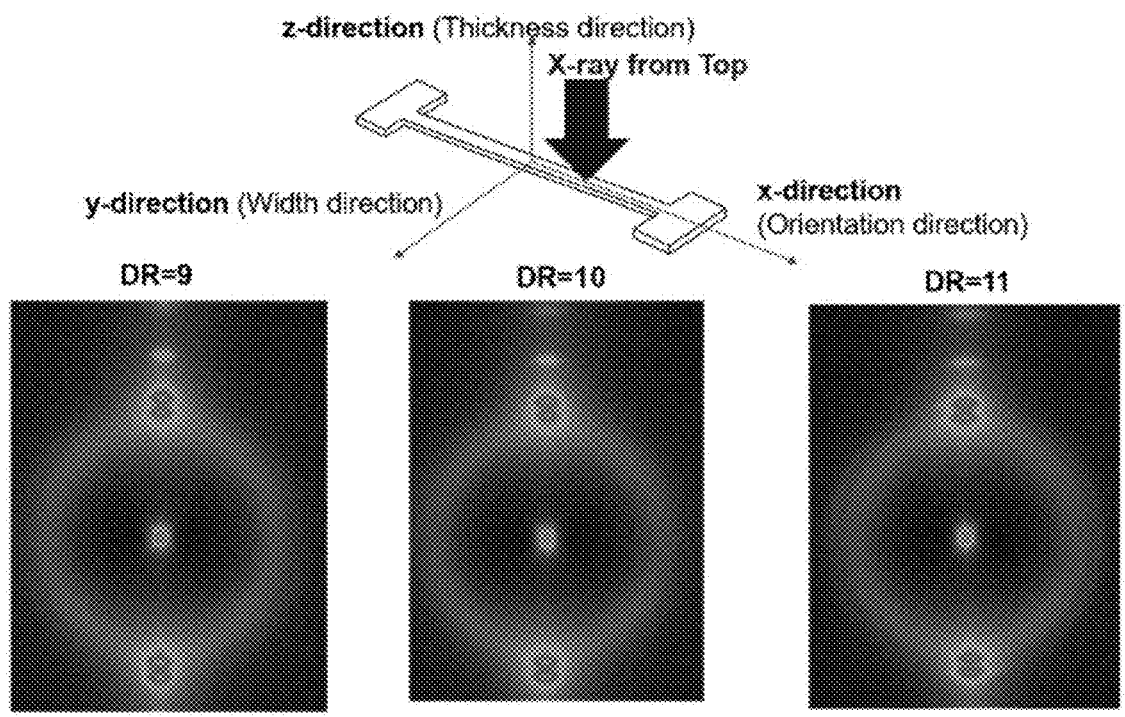
FIGS. 17(A-L) illustrate 2-D Wide-Angle X-ray diffraction patterns from the flat-on (A-C) and edge-on (G-I) directions for the oriented rods with DR=9, 10 and 11, respectively. Also shown are the corresponding 1-D profiles from flat-on direction (D-F) and edge-on direction (J-L). The 2-D WAXD patterns displayed strong re-flections on the equator at 2 θ=21.7° and 24.0°, which can be referred to the orthorhombic (110) and (200) crystalline plane, respectively. The Herman's orientation parameter for the oriented thin rod with DR=9, 10 and 11 are 0.79, 0.80 and 0.82, in flat-on direction and 0.77, 0.79 and 0.80 in edge-on direction, respectively.
Figures 17D, 17E, 17F:
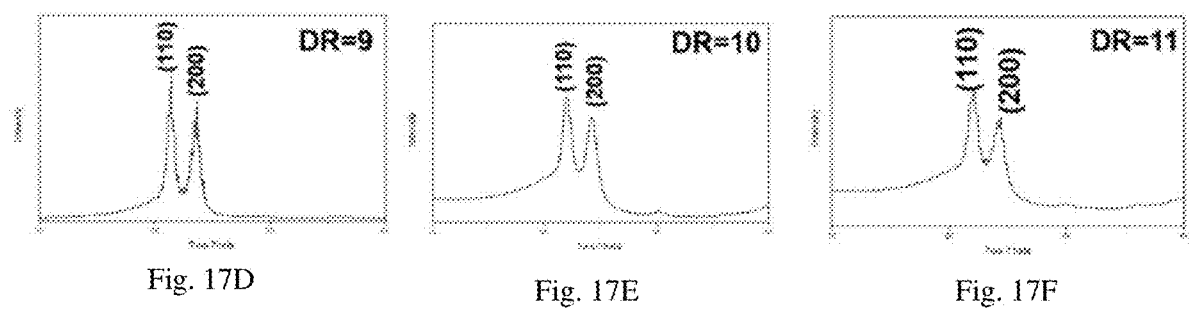
Figures 17G, 17H, 17I:
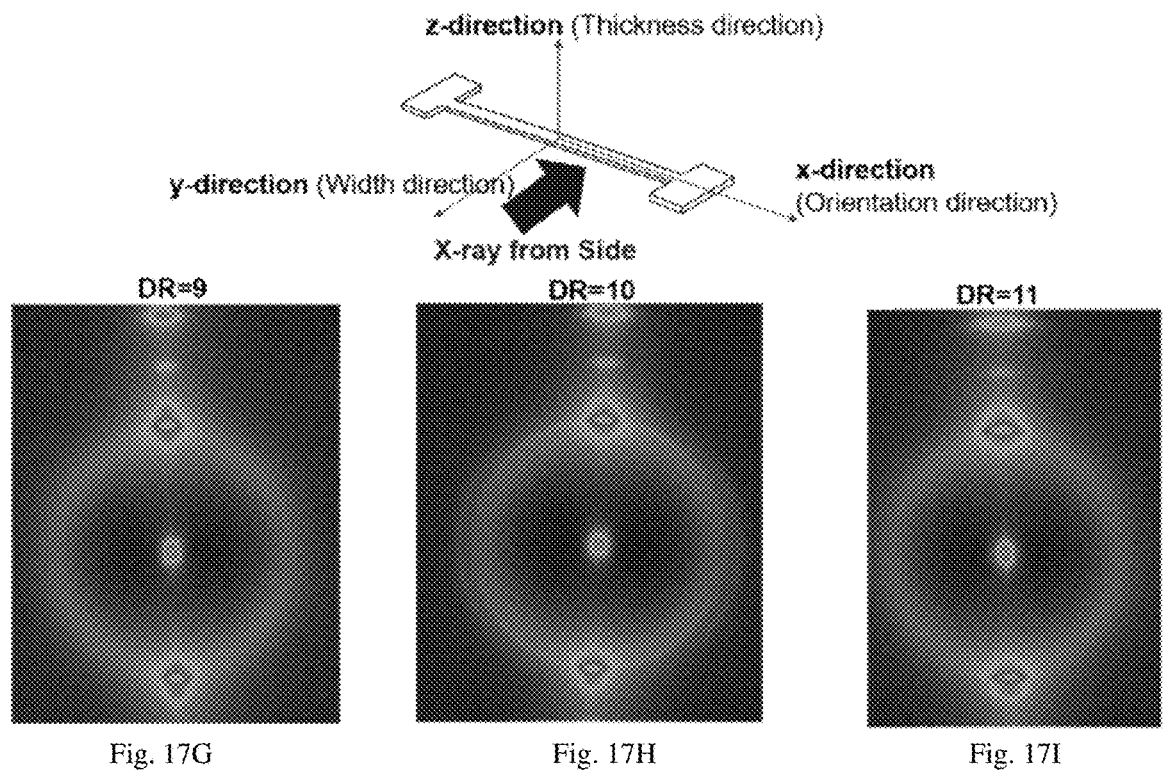
Figures 17J, 17K, 17L:
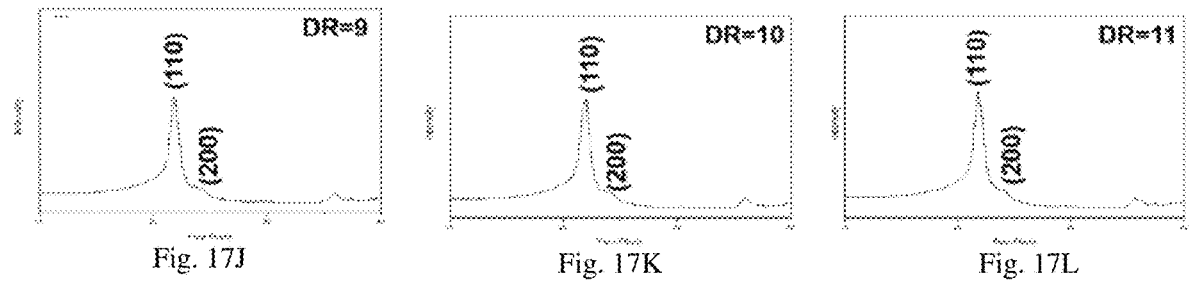

The lateral adhesive force was measured using the modified trouser tear technique, as shown in FIG. 15(A). The typical load-displacement curve is shown in FIG. 15(B). It shows that upon the application of the load an initial static damage zone is created. At approximately 15 N, the tear propagation began and reached a lower steady adhesive force of 8.2 N. The calculated toughness based on this load force was 16.4 kJ/m. This value is over fifteen times higher than the gel-spun fiber with a reported toughness of 0.941 kJ/m. FIG. 16 shows a typical fracture surface, exhibiting stress-induced delamination of the microfibers responsible for this enhanced lateral adhesion. Some of the microfibers were fractured out of the plane (white rectangle), and some were attached between the delaminated microfibers (black rectangle). This supports previous observations that cross-rolling (Stage 1) followed by uniaxial orientation (Stage 2) produces oriented thin rods, comprising a crystalline composite network having improved lateral adhesion.

Previous studies introduced a solid-state, uniaxial, extrusion processing technique for fabricating highly oriented PE. The extruded samples they produced exhibited poor lateral adhesion due to the weak radial van der Waals force. Late studies, developed a uniaxial roller drawing technique. In order to achieve a tangent modulus of approximately 40 GPa, this technique required a draw ratio greater than twenty. This draw ratio is much higher for producing a comparable tangent modulus than that of the two stage oriented thin rods (i.e., DR=11). This significant difference in the draw capability is attributed to the biaxial rolling process producing a textured crystalline structure having weakened inter-spherulitic boundaries. Furthermore, uniaxial orientation after cross-rolling forming an oriented and interconnected micro- and nanofibrillar structure contributes to the enhanced mechanical behavior and lateral adhesive properties.

Wide and Small Angle X-Ray Scattering

Wide-angle X-ray diffraction (WAXD) was used to investigate the crystalline phase of the HDPE rods oriented at 90° C. at draw ratios of 9, 10 and 11. FIG. 17, shows the WAXD patterns obtained in the flat-on (top) direction and the edge-on (side) direction. FIG. 17(A-C) depict the 2-D WAXD patterns. The corresponding 1-D line profiles of the flat-on direction are shown in FIG. 17(D-F). The 2-D WAXD patterns displayed sharp reflections on the equator at 2 0=21.7° and 24.0°, indicating the orthorhombic (110) and (200) phase. Similarly, FIG. 16(G-I) show sharp reflections from the edge-on direction on the equator at 2θ=21.7° and 24°, which also can be indexed to the orthorhombic (110) and (200) phase. The corresponding 1-D line profiles are summarized in FIG. 17(J-L). The Herman's orientation parameter for the oriented thin rod with draw rations of 9, 10 and 11 in the flat-on direction are 0.79, 0.80 and 0.82, respectively, and in the edge-on direction 0.77, 0.79 and 0.80, respectively. It is observed that in both directions the highest draw ratio exhibits the highest orientation. In comparison to the gel-spun fibers with draw ratio greater than fifty and thicknesses about 15-20 μm, a Herman's orientation function greater than 0.99 is observed. The oriented rods produced from this two-stage process are more than forty-five times thicker than gel-spun fibers. They have a comparable tangent modulus and an enhanced lateral adhesion fifteen times greater than gel-spun fibers. This enhanced performance illustrates the benefits of our novel two-stage processing technique.

Figure 18A:
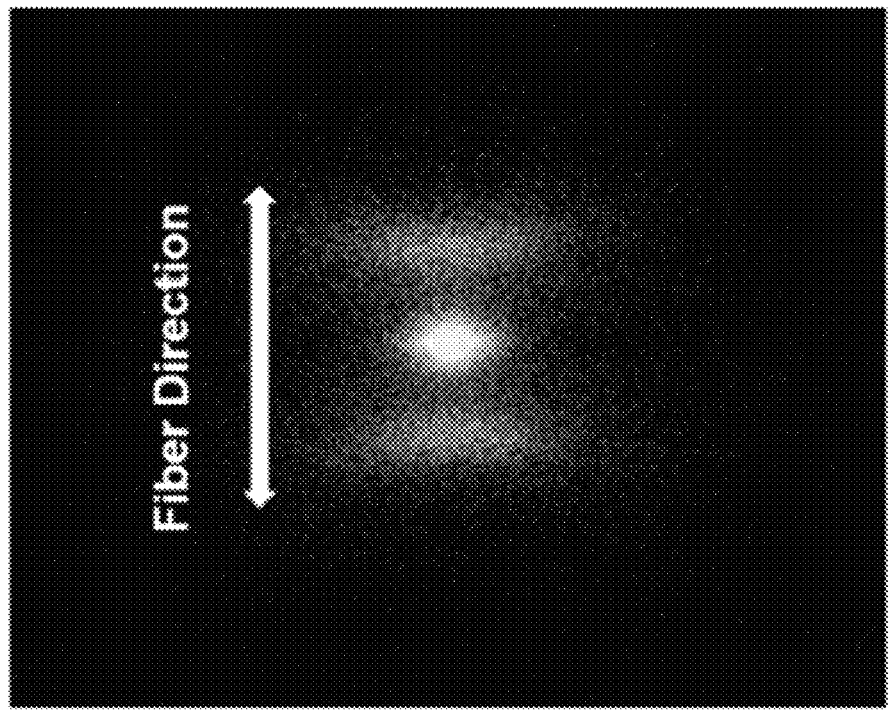
FIGS. 18(A-C) illustrate 2-D Small-Angle X-ray scattering patterns of the oriented thin rods with (A) DR=9, (B) DR=10 and (C) DR=11. The highest draw ratio (DR=11) shows the most evident equatorial streaks and meridional lobes (FIG. 12C), indicating that the highest alignment of lamellar structure along the tensile direction.
Figure 18B:
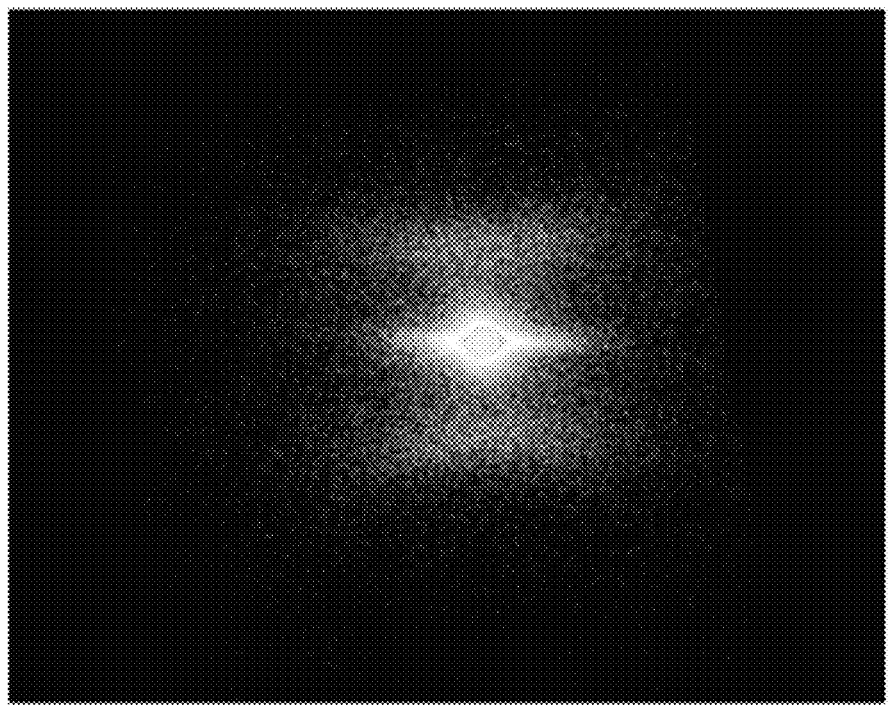
Figure 18C:
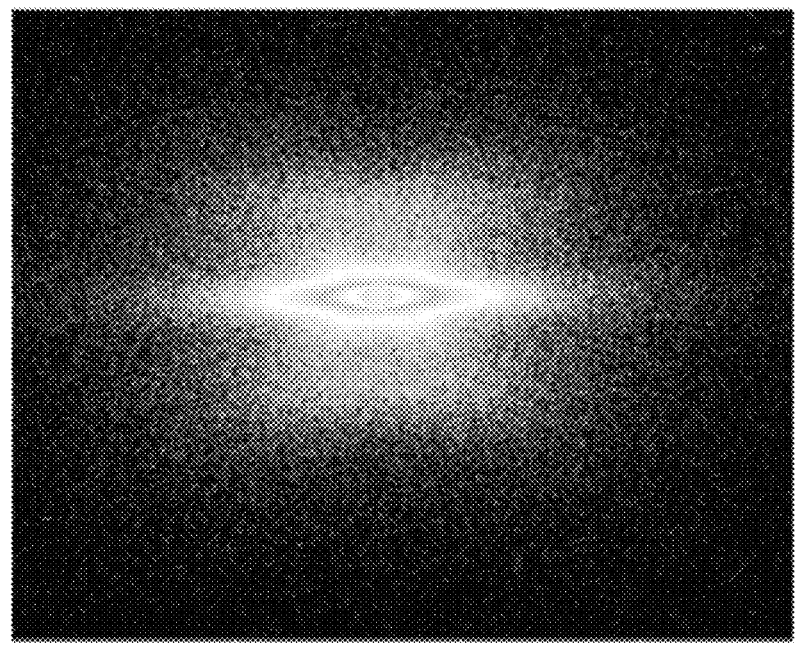
Figure 19A:
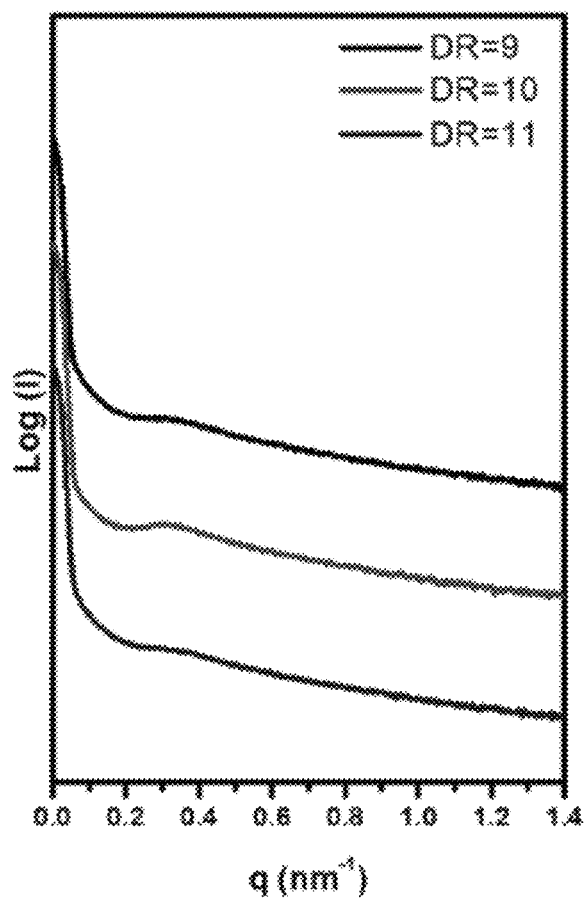
FIGS. 19(A-B) illustrate (a) 1-D Small-Angle X-ray profile of the oriented thin rods at various draw ratios. The average lamellar thicknesses were established using the correlation function approach shown in (b).
Figure 19B:
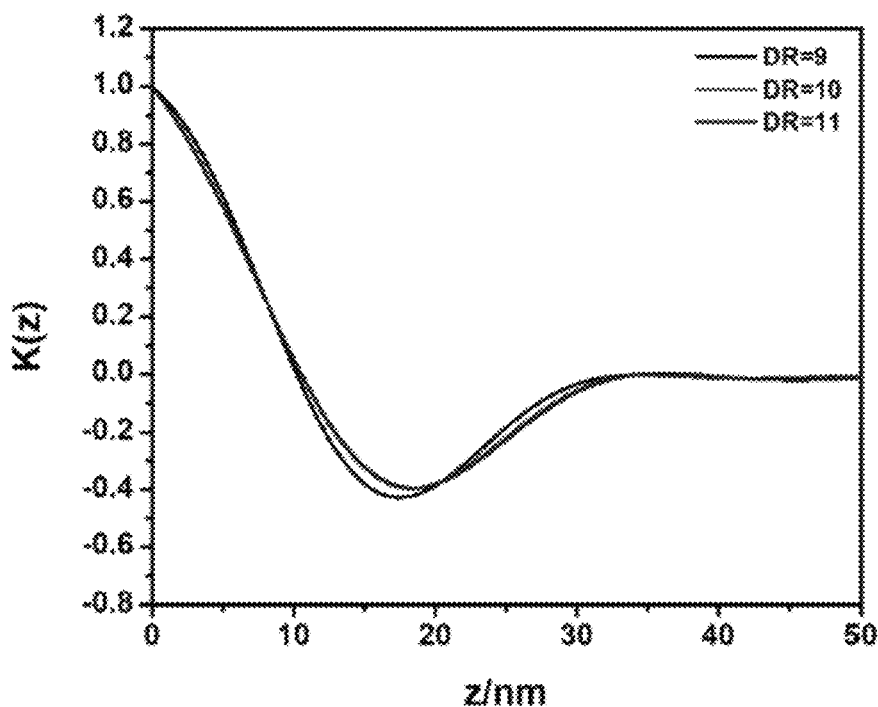

Small-angle X-ray scattering (SAXS) was also performed on oriented HDPE rods with DR=9, 10, and 11. As shown in FIG. 18(A), the 2-D SAXS pattern from the oriented rod with DR=9 indicates the emergence of equatorial streak and meridional lobes. The equatorial streaks suggest both micro- and nanofibrous structures, and the meridional lobes are folded lamellae parallel to the draw direction. As expected, the highest draw ratio (DR=11) shows the most intense equatorial streaks and meridional lobes (FIG. 18(C)). This indicated that the highest fibrillar alignment and lamellar orientation were achieved under these conditions along the draw direction. FIG. 19 shows the 1-D SAXS profiles and the corresponding correlation functions for the thin rods having draw ratios of 9, 10 and 11. The calculated average lamellar thickness of the oriented rod with draw ratios of 9, 10 and 11, on the basis of the correlation function, was approximately 20, 20 and 19 nm, respectively. The corresponding long spacing, average amorphous thickness and the lamellar thickness for the thin rods relative to the draw ratios are summarized in Table 4.

TABLE 4

Long Spacing, average amorphous thickness and lamellar thickness as a function of draw ratio

| Sample | Long Spacing (nm) | Average Amorphous Thickness (nm) | Lamellar Thickness (nm) |
|---|---|---|---|
| DR = 9 | 35 | 15 | 20 |
| DR = 10 | 36 | 16 | 20 |
| DR = 11 | 35 | 16 | 19 |

Differential Scanning Calorimetry (DSC)

Figure 20:
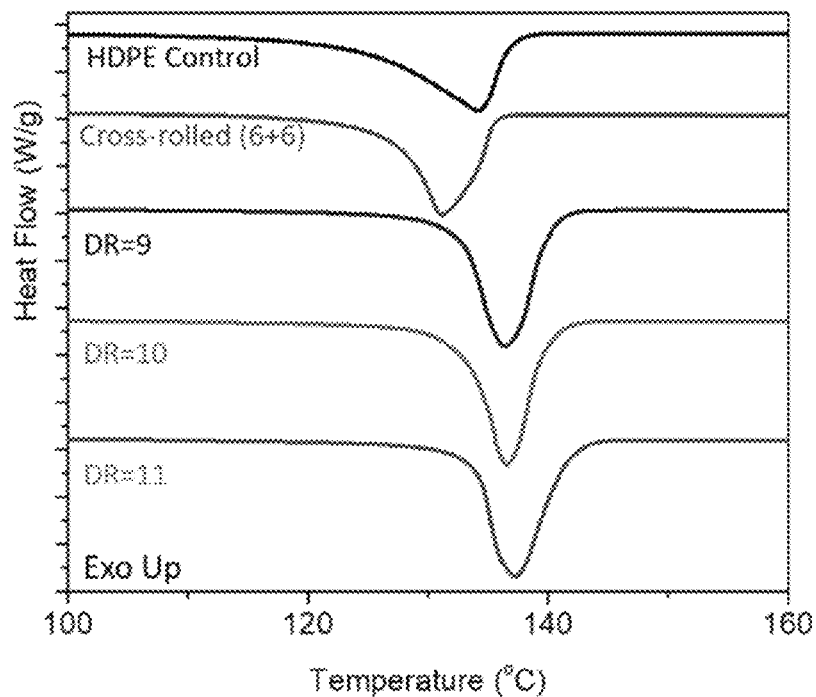
FIG. 20 illustrates DSC thermographs of the control, cross-rolled (6+6), and oriented HDPE rods with DR=9, DR=10 and DR=11.

In FIG. 20, the thermographs are shown as functions of the draw ratio. The data are further analyzed in Table 5. The original HDPE plaque had a melting point of 134° C. After cross-rolling, the melting point decreased to 131° C., along with a decrease in the crystallinity from 63 to 58%. The decrease in the melting point and crystallinity can be attributed to the deformation and destruction of the HDPE spherulites during the cross-rolling process (Stage 1). Orientation increased the melting points of the thinly oriented rods (Stage 2) from 131° C. to 139° C. As expected, the crystallinity increased from 69 to 78%, which was correlated with an increase in the melting temperature.

It is interesting to note that the lamellar thickness of 19 nm remained essentially constant during the orientation, although the lamellae themselves were oriented with folded chains parallel to the draw direction. The increase in crystallinity and melting points could be attributed to an increase in the concentration of partially extended chain crystals aligned in the direction of orientation.

Figure 21:
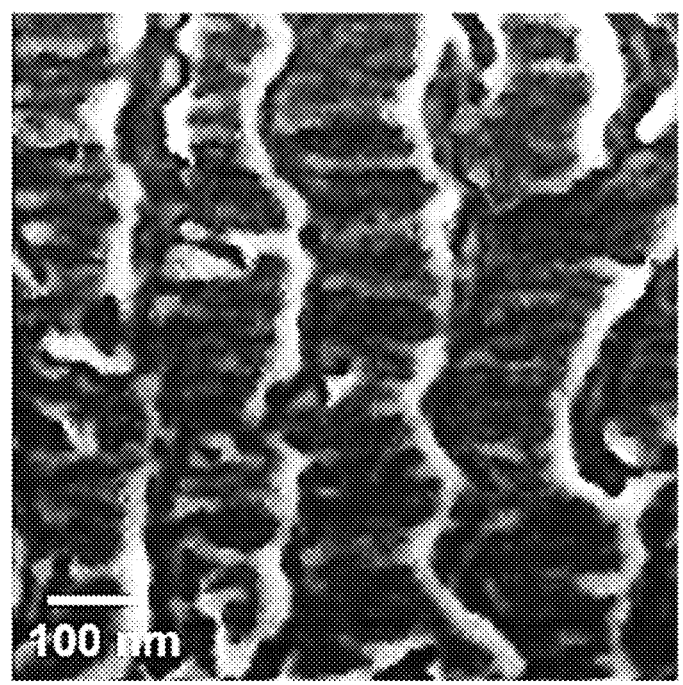
FIG. 21 illustrates the phase contrast atomic force micrograph of an oriented nanofiber using our two stage process with DR=11. The strong undulating white regions are harder high-modulus interlocking zones between the nearly perpendicular lamellar regions.
Figure 22:
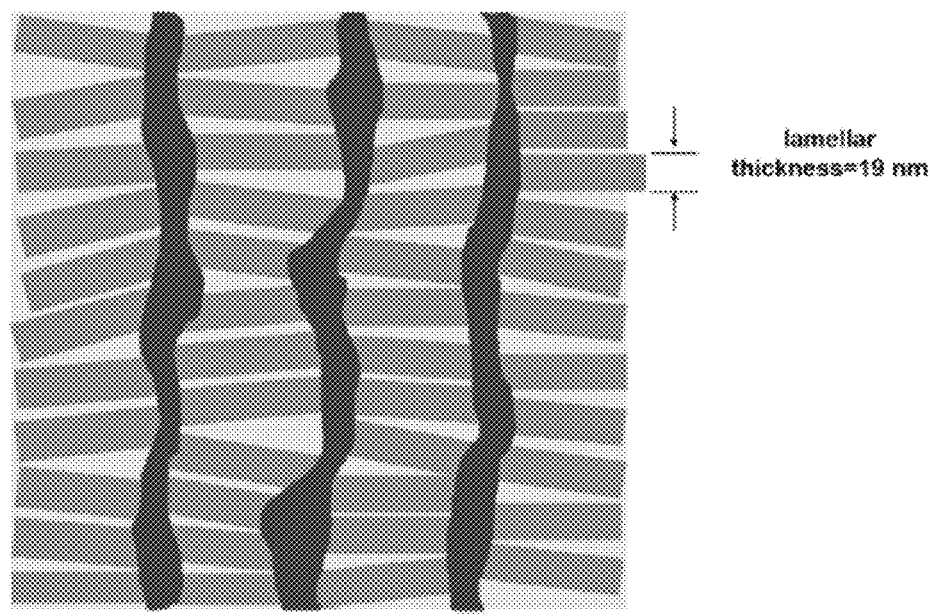
FIG. 22 is a schematic illustration of the nanoscale structure within nanofibers showing the lamella nearly perpendicular to the undulating harder regions. The lamella thickness of 19 nm was obtained from SAXS.

FIG. 21 shows a typical AFM phase contrast micrograph of the nanofibers within the oriented microfiber having a draw ratio of 11. The irregular lamellar crystals are attached to the undulated interlocking harder (white) regions parallel to the tensile direction. These undulating harder regions are similar to that previously observed for gel-spun UHMWPE fibers, also using phase contrast AFM, (FIG. 6C), and using TEM, (FIG. 21). The alignment of the interlocking harder regions in FIG. 21 is not as oriented as in gel-spun fibers. This reflects the difference arising from the two-stage process of biaxially cross-rolling and uniaxial orientation, which exhibits low draw ratios, compared to the highly uniaxial gel-spinning process having very high draw ratios. A schematic summarizing these features is shown in FIG. 22.

Hierarchical Structures and Properties

Figure 23A:
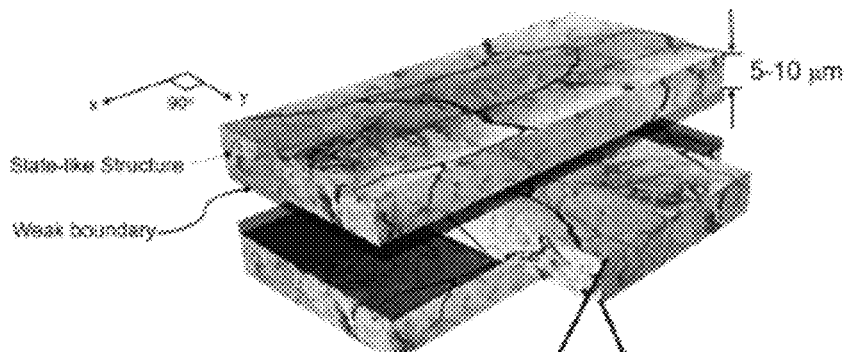
FIGS. 23(A) and (B) emphasize the structural evolution during the processing, Stages 1 and 2.
Figure 23B:
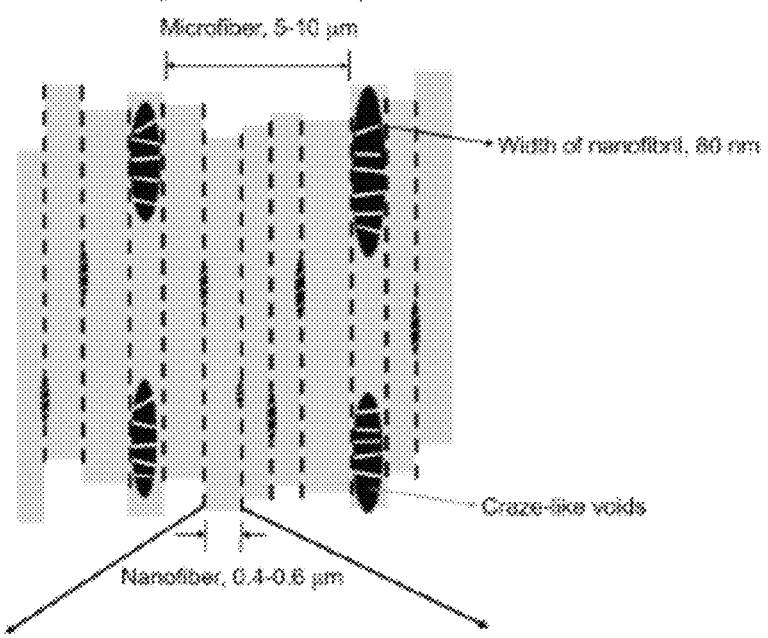
FIGS. 23(A-C) illustrate summary schematic illustration of the hierarchical structure. This complex oriented composite system is shown with decreasing scales.
FIG. 23(C) illustrates the oriented imperfect solid-state nanostructure within the nanofiber.
Figure 23C:
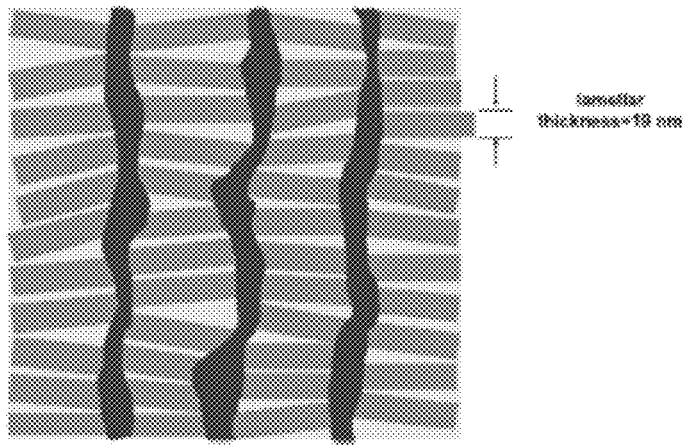

The hierarchical structures shown in FIG. 23 emphasize the structural evolution during Stages 1 and 2 processing. In particular, the emphasis is on the structural scale and the interactions between scales. Delamination followed by crazing is required to produce stiff and strongly oriented thin rods. Notably, a high orientation can be achieved only with the aid of crazing regions arising from weak boundaries. This results in a complex, oriented composite structure containing crazes within a network of interlocking fibers.

The product described in this paper has a tangent modulus of 37 GPa, and a tensile strength of 680 MPa, which is different in various aspects. The low density of 0.930 g/cc is due to craze voiding during processing. The lateral adhesions were high. However, its crystallinity was only 78%. Unexpectedly, the draw ratio was only 11 to achieve enhanced mechanical properties. The calculated Herman's orientation function (0.81 for our thin rods is also low, indicating that the overall crystalline structure is less oriented when compared with gel-spun UHMWPE fibers. A quantitative mechanical model based on this complex-oriented hierarchical structure is currently not available. If one assumes that the crystals are completely oriented in a defect-free structure, a modulus significantly greater than 400 GPa can be achieved. However, the proposed hierarchical structure is highly laden with defects in both the oriented crystalline and amorphous phases and is not yet sufficiently oriented to achieve higher stiffness. In addition, large and small micro-voided crazes were present throughout the solid-state structure. Research to further improve the mechanical behavior using this two-stage multi-axial solid-state methodology is suggested by applying the lessons learned from the proposed evolution of hierarchical structures during processing.

A two-stage solvent-free process for creating thin rods of high-modulus polyethylene is described using conventional HDPE with a broad molecular weight distribution. The oriented thin rods were twenty times thicker than the thickest available gel-spun fiber product produced from UHMWPE. In addition, thin rods exhibit impressive lateral adhesive strength, which is usually not observed in high-modulus gel-spun fibers. Surprisingly, high-modulus and strong thin rods were created in this work under relatively low uniaxial tensile orientation conditions, namely DR=11. Gel-spun UHMWPE fiber processing requires an orientation greater than thirty times.

Our product had a reduced density owing to profuse craze-like cavitation during solid-state processing under specific thermal and drawing conditions. The crazes that were parallel to the draw direction contained nanofibrils that were 80 nm in diameter. These cavitated structures were a direct result of the weak boundaries present in the cross-rolled slate structure and original spherulitic boundaries. Elucidation of the solid-state structure enabled an understanding of the evolution of oriented hierarchical structures during processing. Further understanding and applications of these evolving hierarchical structures should serve as a guide for future research.

Example 2

Biaxial Cross Rolling Followed by Uniaxial Orientation of a Polyethylene Sheet

A high density polyethylene (HDPE) plaque having original dimensions of 127 mm by 127 mm and an original thickness of 6.4 mm was compressed at room temperature by subjecting the plaque to two counter-rotating steel rolls having an adjustable gap between the rolls. The gap was initially set at 90% of the original plaque thickness; i.e., 6.4 mm×0.9=~5.8 mm. After the initial pass through the compression rolls the thickness of the plaque was measured and the gap between the rolls adjusted to 90% of the new dimension. The plaque was rotated 90 degrees and passed through the rolls further reducing the overall thickness and increasing the lateral dimensions of the plaque. The thickness of the plaque was again determined and the gap between the rolls adjusted to 90% of that thickness. The plaque was rotated back 90 degrees to the original orientation and compression rolled a third time. This process of determining the plaque thickness then adjusting the roll gap and biaxially alternating the orientation of the plaque was continued several times. After twelve passes (six alternating in each direction or 6×6) the plaque thickness was 1.3 mm and the lateral dimensions 280 mm by 280 mm.

A tensile test specimen was then obtained from the biaxially compression rolled HDPE plaque which had been subjected to twelve alternating compression passes through the roll mill. The orientation of the tensile test specimen was taken in one of the two compression rolled directions. This tensile test specimen was uniaxially drawn at 80° C. at a draw rate of 100%/min to a draw ratio of 11.5; which is less than the observed draw ratio for failure of a similar test specimen taken from the same plaque. After drawn to a draw ratio of 11.5, a new test specimen was obtained from the region of high orientation within the resulting test specimen. This new test specimen was subjected to a subsequent tensile test to determine the mechanical properties. The mechanical properties of this test specimen demonstrated enhanced mechanical performance compared to the original HDPE plaque and the HDPE plaque that had only been biaxially compression rolled and not oriented to a high draw ratio. These properties are listed in Table 5.

TABLE 5

| Test Specimen Origin | Modulus (GPa) | Tensile Strength (MPa) | Strain at Break (%) |
| --- | --- | --- | --- |
| HDPE Control Plaque | 1.3 | 28 | 820 |
| 6x6 Cross Rolled Plaque | 1.0 | 51 | 460 |
| 6x6 Cross Rolled and Uniaxially Oriented to a DR 11.5 | 28.9 | 430 | 2.8 |

Example 3

Comparison of the Mechanical Properties of a Polyethylene Sheet after Biaxial Compression Cross Rolling and Uniaxial Compression Rolling after Uniaxial Tensile Orientation to the Maximum Obtainable Draw Ratios (Comparative Example: Biaxial to Uniaxial Compression Rolling)

A high density polyethylene (HDPE) plaque similar to that in Example 2 having original dimensions of 45 mm by 127 mm and an original thickness of 6.4 mm was compressed at room temperature by subjecting the plaque to two counter-rotating steel rolls having an adjustable gap between the rolls. The gap was initially set at 90% of the original plaque thickness; i.e., 6.4 mm×0.9=~5.8 mm. After the initial pass through the compression rolls the thickness of the plaque was measured and the gap between the rolls adjusted to 90% of the new dimension. In contrast to Example 2 the polyethylene plaque was not rotated between successive passes through the compression rolls. After twelve uniaxial passes through the compression rolls the plaque thickness was 1.3 mm and the lateral dimensions 61 mm by 580 mm.

As in Example 2, a tensile test specimen was obtained from the uniaxially compression rolled HDPE plaque. The orientation of the tensile test specimen was taken in the rolled direction. The tensile test specimen was uniaxially drawn at 80° C. to a draw ratio of 3.0; which is less than the observed draw ratio for failure of a similar test specimen taken from the same plaque.

After drawn to a draw ratio of 3.0, a new test specimen was obtained from the region of high orientation within the drawn specimen. The new test specimen was subjected to a tensile test to determine the mechanical properties. It was observed that the mechanical properties of the test specimen taken from the 12x uniaxially oriented plaque and subjected to a uniaxial tensile orientation to a draw ratio of 3.0 at 80° C. demonstrated weaker mechanical properties compared to the HDPE plaque having been 6×6 biaxially compression rolled and oriented to a draw ratio of 11.5. These properties are listed in Table 6.

TABLE 6

| Test Specimen Origin | Modulus (GPa) | Tensile Strength (MPa) | Strain at Break (%) |
|---|---|---|---|
| 6×6 Cross Rolled Sheet | 1.0 | 51 | 460 |
| 12x Uniaxially Rolled Sheet | 0.3 | 81 | 87 |
| 6×6 Cross Rolled and Oriented to a DR 11.5 | 28.9 | 430 | 2.8 |
| 12x Uniaxially Rolled and Unixially Oriented to a DR 3.0 | 4.3 | 340 | 13 |

Example 4

Comparison of the Mechanical Properties of a Polyethylene Tensile Specimens taken at Different Orientations from a Biaxial Compression Cross Rolled Polyethylene Sheet prior to Uniaxial Tensile Orientation (Comparative Example Demonstrating Isotropy of Cross Rolled Plaque)

A high density polyethylene (HDPE) plaque similar to that in Example 2 having original dimensions of 127 mm by 127 mm and an original thickness of 6.4 mm was compressed at room temperature by subjecting the plaque to two counter-rotating steel rolls having an adjustable gap between the rolls. The gap was initially set at 90% of the original plaque thickness; i.e., 6.4 mm×0.9=~5.8 mm. After the initial pass through the compression rolls the thickness of the plaque was measured and the gap between the rolls adjusted to 90% of the new dimension. After twelve passes (six alternating in each direction or 6×6) the plaque thickness was 1.3 mm and the lateral dimensions 280 mm by 280 mm Two different tensile test specimens were obtained from the biaxially compression rolled HDPE plaque. The orientation of one tensile test specimen was taken in one of the two compression rolled directions and the orientation of the second tensile test specimen was taken at 45 degrees or midway between the compression rolled directions. The two tensile test specimens were uniaxially drawn at 90° C. to a draw ratio of 10 and 11, respectively; which is less than the observed draw ratio for failure of a similar test specimens taken from the same plaque. After each test specimen was drawn to the respective draw ratios, new tensile test specimens were obtained from the highly drawn regions within the drawn specimens. These new test specimen were subjected to a tensile test to determine the mechanical properties. The mechanical properties of the tensile test specimens taken from two different orientations of the 6×6 cross rolled polyethylene sheet demonstrate the isotropy of the enhanced mechanical performance when compared to the original HDPE plaque. These properties are listed in Table 7.

TABLE 7

| Test Specimen Origin | Modulus (GPa) | Tensile Strength (MPa) | Strain at Break (%) |
|---|---|---|---|
| HDPE Control Plaque | 1.3 | 28 | 820 |
| 6×6 Cross Rolled and Uniaxially Oriented Parallel to the Roll Direction to DR = 10 | 37 | 680 | 3.7 |
| 6×6 Cross Rolled and Uniaxially Oriented at 45 Degrees to the Roll Direction to DR 11 | 31 | 740 | 4.7 |

Example 5

Biaxial Cross Rolling followed by Uniaxial Orientation at 90C of a Polyethylene Sheet (Maximum Observed Performance)

A high density polyethylene (HDPE) plaque similar to that in Example 2 having original dimensions of 127 mm by 127 mm and an original thickness of 6.4 mm was compressed at room temperature by subjecting the plaque to two counter-rotating steel rolls having an adjustable gap between the rolls. The gap was initially set at 90% of the original plaque thickness; i.e., 6.4 mm×0.9=~5.8 mm. After the initial pass through the compression rolls the thickness of the plaque was measured and the gap between the rolls adjusted to 90% of the new dimension. After twelve passes (six alternating in each direction or 6×6) the plaque thickness was 1.3 mm and the lateral dimensions 280 mm by 280 mm.

A tensile test specimen was then obtained from the biaxially compression rolled HDPE plaque. The orientation of the tensile test specimen was taken in one of the two compression rolled directions. This tensile test specimen was uniaxially drawn at 90° C. at a strain rate of 250%/min to a draw ratio of 10; which is less than the observed draw ratio for failure of a similar test specimen taken from the same plaque. After drawn to a draw ratio of 10, a new test specimen was obtained from the region of high orientation within the drawn specimen. This new test specimen was subjected to a subsequent tensile test to determine the mechanical properties. The mechanical properties of this test specimen taken from the 6×6 oriented plaque and subjected to a uniaxial orientation to a draw ratio of 10 at 90° C. demonstrated enhanced mechanical performance when compared to the original HDPE plaque and the HDPE plaque that had been only biaxially compression rolled and not oriented to a high draw ratio. These properties are listed in Table 8.

TABLE 8

| Test Specimen Origin | Modulus (GPa) | Tensile Strength (MPa) | Strain at Break (%) |
|---|---|---|---|
| HDPE Control Plaque | 1.3 | 28 V | 820 |
| 6x6 Cross Rolled Plaque | 1.0 | 51 | 460 |
| 6x6 Cross Rolled and Oriented at 80C to a DR 11.5 (100%/min) | 28.9 | 430 | 2.8 |
| 6x6 Cross Rolled and Oriented at 90C to a DR 10 (250 %/min) | 37.0 | 682 | 3.7 |

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

Having described the invention, we claim:

1. A method of producing high modulus and high strength polymer materials, the method comprising:
   compressive rolling a semicrystalline polymer material in at least two different axial directions of the material; and
   uniaxially orienting at least a portion of the compressive rolled material such that the portion of the compressive rolled material is stretched along a single axial direction of the portion of the compressive rolled material to a draw ratio less than the ultimate elongation or the elongation % at break of the material to form a high modulus and high strength polymer rod or filament, wherein the single axial direction is along the length of the rod or filament.

2. The method of claim 1, wherein the semicrystalline polymer material is compressive rolled at temperature between the Tg and Tm of the material.

3. The method of claim 1, wherein the semicrystalline polymer material makes a first pass between a pair of rolls of a compressive roller to effect a reduction in thickness of the material about 1% to less than about 60%, and thereafter makes a second pass between the rolls different from the direction of the first pass to effect a further reduction in the thickness of the material about 1% to less than about 60%.

4. The method of claim 3, wherein the distance between the pair of rolls during the first pass is about 40% to about 99% of the thickness of the material and distance between the pair of rolls during the second pass different from the direction of the first pass is about is about 40% to about 99% of the thickness the material after the first pass.

5. The method of claim 1, wherein material is compressive rolled along a first axis of the material and along a second axis of the material different than the first axis, wherein the first axis and the second axis are in substantially the same plane.

6. The method of claim 5, wherein the second axis is between about 5° to about 175° different than the first axis of the material.

7. The method of claim 6, wherein the second axis is about 15° to about 90° different than the first axis of the material.

8. The method of claim 5, wherein the single axial direction is in the same plane of the first axis and second axis.

9. The method of claim 1, wherein the material is compressive rolled at least three or more times wherein each pass through the compressive roller is along an axis of the material that differs from the axis of the material during the previous pass through the compressive roller and wherein pass through the compressive roller reduces the thickness of the material by at least about 0.1%.

10. The method of claim 9, wherein the material is compression rolled in alternating axial directions.

11. The method of claim 10, wherein the distance between compressive rolls of the compressive rollers is less than about 95% of the thickness of the material during each pass through the compressive rollers.

12. The method of claim 10, wherein the thickness of the material is larger than the roll-gap separation of the compressive roller.

13. The method of claim 1, wherein the compressive rolled material is uniaxially oriented at a draw ratio of at least 2.

14. The method of claim 1, wherein the compressive rolled material is uniaxially oriented above the Tg but below the Tm of the polymer material.

15. The method of claim 1, wherein the compressive rolled material is uniaxially oriented at a strain rate of at least about 50%/min or more.

16. The method of claim 1, wherein the uniaxially oriented material includes a plurality uniaxially aligned microfibrils and a plurality of nanofibrils linking laterally adjacent uniaxially aligned microfibrils.

17. The method of claim 16, wherein the microfibrils have a length of about 1 μm to about 5 μm and the nanofibrils have a length less about 100 nm.

18. The method of claim 1, wherein the semicrystalline polymer material comprises at least one of homopolymers or copolymers of polyethene or polypropylene.

19. The method of claim 1, wherein the method and semicrystalline polymer material are solvent-free.

* * * * *